US010202142B2

(12) United States Patent
Taenaka et al.

(10) Patent No.: US 10,202,142 B2
(45) Date of Patent: Feb. 12, 2019

(54) RACK GUIDE DEVICE AND STEERING APPARATUS INCLUDING SAME

(71) Applicant: JTEKT CORPORATION, Osaka-shi, Osaka (JP)

(72) Inventors: Makoto Taenaka, Kashiba (JP); Hidetoshi Sumihara, Kitakatsuragi-gun (JP); Kazuhiro Watanabe, Amagasaki (JP); Yasuto Takaki, Kashiba (JP); Tetsuji Miyano, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 283 days.

(21) Appl. No.: 14/781,202

(22) PCT Filed: Mar. 31, 2014

(86) PCT No.: PCT/JP2014/059401
§ 371 (c)(1),
(2) Date: Sep. 29, 2015

(87) PCT Pub. No.: WO2014/163029
PCT Pub. Date: Oct. 9, 2014

(65) Prior Publication Data
US 2016/0052538 A1   Feb. 25, 2016

(30) Foreign Application Priority Data

Apr. 1, 2013   (JP) ................. 2013-076311
May 27, 2013   (JP) ................. 2013-111202

(51) Int. Cl.
*B62D 3/12*   (2006.01)
*F16H 55/28*   (2006.01)

(52) U.S. Cl.
CPC .............. *B62D 3/123* (2013.01); *F16H 55/28* (2013.01)

(58) Field of Classification Search
CPC ........ B62D 3/123; F16H 55/28; F16H 55/283
(Continued)

(56) References Cited

U.S. PATENT DOCUMENTS 3,157,061 A * 11/1964 Parker .................... B62D 3/123
                                                                74/422
5,660,078 A *  8/1997 Phillips ................. B62D 3/123
                                                                180/427
(Continued)

FOREIGN PATENT DOCUMENTS

EP   1086880 A2   3/2001
EP   1184255 A2   3/2002
(Continued)

OTHER PUBLICATIONS

Nov. 30, 2016 Office Action issued in Chinese Patent Application No. 201480019816.7.
(Continued)

*Primary Examiner* — William C Joyce
(74) *Attorney, Agent, or Firm* — Oliff PLC

(57) ABSTRACT

A rack guide device includes a rack guide, a blocking member, a plate spring and a holding member. The rack guide is accommodated in an accommodating portion that is formed in a housing through which a rack shaft is inserted so as to move towards or away from the rack shaft and that supports the rack shaft so that the rack shaft slides in an axial direction thereof. The blocking member is fixed to an external opening end provided on an opposite side of the accommodating portion to a side thereof that faces the rack shaft. The disc spring is interposed between the blocking member and the rack guide to bias the rack guide towards the rack shaft. The holding member holds the disc spring and is directly or indirectly held to the rack guide or the blocking member through frictional engagement.

12 Claims, 25 Drawing Sheets

(58) Field of Classification Search
USPC .................................................. 74/409, 422
See application file for complete search history.

(56) References Cited

U.S. PATENT DOCUMENTS

| | | | | |
|---|---|---|---|---|
| 6,595,532 | B2* | 7/2003 | Tanaka | B62D 3/123 |
| | | | | 280/93.515 |
| 7,930,951 | B2* | 4/2011 | Eickholt | B62D 3/123 |
| | | | | 74/388 PS |
| 8,327,731 | B2 | 12/2012 | Sung et al. | |
| 2008/0034911 | A1* | 2/2008 | Bieber | B62D 3/123 |
| | | | | 74/422 |
| 2010/0122595 | A1 | 5/2010 | Sung et al. | |
| 2012/0318085 | A1* | 12/2012 | Park | B62D 3/123 |
| | | | | 74/409 |
| 2014/0251035 | A1* | 9/2014 | Ricker | B62D 3/123 |
| | | | | 74/30 |

FOREIGN PATENT DOCUMENTS

| | | |
|---|---|---|
| GB | 976661 A | 12/1964 |
| GB | 2333079 A | 7/1999 |
| JP | H01-174284 U | 12/1989 |
| JP | 4-224464 * | 8/1992 |
| JP | H09-39805 A | 2/1997 |
| JP | H11-43055 A | 2/1999 |
| JP | 2008-307966 A | 12/2008 |

OTHER PUBLICATIONS

Nov. 17, 2016 Extended Search Report issued in European Patent Application No. 14779859.9.
May 13, 2014 International Search Report received in International Patent Application No. PCT/JP2014/059401.

* cited by examiner

RACK GUIDE DEVICE AND STEERING APPARATUS INCLUDING SAME

TECHNICAL FIELD

The present invention relates to a rack guide device and a steering apparatus including the same rack guide device.

BACKGROUND ART

In general, a rack guide device is provided in a rack-and-pinion type steering apparatus to restrict backlash arising between a rack and a pinion. In this rack guide device, in case a rack guide that supports a rack shaft slidably wears, a gap between the rack guide and a plug is corrected as a result of a compression coil spring that is interposed between the rack guide and the plug pushing out the rack guide towards the rack shaft.

In Patent Literature 1, a disc spring is interposed in series with a compression coil spring between a rack guide and a plug. The disc spring deflects only when a great impact load is inputted to absorb the impact.

CITATION LIST

Patent Literature

[Patent Literature 1] JP-A-11-43055

SUMMARY OF INVENTION

Technical Problem

In FIG. 4 in Patent Literature 1, the disc spring and an interposed member that is interposed between the compression spring and the disc spring (the interposed member being referred to as a second rack support in Patent Literature 1) are accommodated and held in place in a cylindrical portion that is provided in the plug. Specifically, the interposed member is held in place through the use of a snap ring that is engaged in circumferential grooves that are formed individually on an inner circumference of the cylindrical portion that guides an outer diameter of the disc spring and an outer circumference of the interposed member, and the disc spring is held between the interposed member and a bottom of the cylindrical portion.

In Patent Literature 1, in holding the disc spring and the interposed member on the plug, it is necessary to perform complex and troublesome work of fitting the snap ring in the circumferential grooves formed individually on the plug and the interposed member. Because of this, the total number of assembling man-hours including those spent assembling the subunit including the plug is increased, causing a problem that the assembling performance is deteriorated.

An object of the invention is to provide a rack guide device that provides a good assembling performance as a whole and a steering apparatus including this rack guide device.

Solution to Problem

With a view to achieving the object, according to the first solution of the present invention, there is provided a rack guide device comprising:

a rack guide that is accommodated in an accommodating portion formed in a housing through which a rack shaft configured to mesh with a pinion shaft is inserted so as to move towards and away from the rack shaft and that supports the rack shaft so that the rack shaft slides in an axial direction of the rack shaft;

a blocking member that is fixed to an external opening end that is provided on an opposite side of the accommodating portion to a side thereof that faces the rack shaft;

at least one disc spring that is interposed between the blocking member and the rack guide to bias the rack guide towards the rack shaft; and a holding member that holds the disc spring and that is directly or indirectly held to the blocking member through frictional engagement.

Additionally, according to the second solution, the rack guide device may comprise a frictional engaging member that is held on at least one of the blocking member and the holding member and is in frictional engagement with the other.

Additionally, according to the third solution, the frictional engaging member may include an elastic member.

According to the fourth solution, the holding member may include a guide tube that guides a radial end portion of the disc spring and an annular washer plate that extends radially from an axial end of the guide tube to receive a load of the disc spring.

In addition, according to the fifth solution, the blocking member may include an opposing portion that faces a circumferential surface of the guide tube, and the frictional engaging member may be interposed between the circumferential surface of the guide tube and the opposing portion of the blocking member.

According to the sixth solution, the frictional engaging member may be held on the circumferential surface of the guide tube to thereby make up a sub-assembly including the holding member, the frictional engaging member and the disc spring, the frictional engaging member and the disc spring may be disposed on the same side of the guide tube with respect to a radial direction of the guide tube, the disc spring may be disposed between the frictional engaging member and the washer plate in relation to an axial direction of the guide tube, and in a state that the sub-assembly is configured, when looking at the sub-assembly from the axial direction of the guide tube, a part of the frictional engaging member may overlap a part of the disc spring.

Additionally, according to the seventh solution, the holding member may include a guide tube that includes an outer circumference having a first portion that is brought into frictional engagement with an inner circumference of a recess portion and a second portion that guides an inner diameter portion of the disc spring, wherein the recess portion is provided on one of the rack guide and the blocking member, and a slit may be formed in the guide tube in an axial direction or a direction that is inclined relative to the axial direction so as to enable an elastic reduction in diameter of the guide tube.

According to the eighth solution, the holding member may include an annular washer plate that extends radially from an axial end of the guide tube to receive a load of the disc spring, and a second slit may be formed in the washer plate so as to continue to a first slit that is the slit formed in the guide tube.

Additionally, according to the ninth solution, the rack guide device may comprise a holding member unit that includes the disc spring and the holding member and so that the disc spring and the holding member are treated as an integral unit, in the holding member unit, an outer diameter of the first portion may be greater than an outer diameter of the second portion and greater than an inner diameter of the disc spring.

According to the tenth solution, a compression coil spring may be interposed between the blocking member and the rack guide and bias the rack guide towards the rack shaft.

Additionally, according to the eleventh solution, the compression coil spring may be disposed in series with the disc spring, and a set load of the compression coil spring may be smaller than a set load of the disc spring.

According to the twelfth solution, the rack guide may comprise a connecting member that connects the holding member to the blocking member so as to restrict a maximum gap amount between the blocking member and the holding member a direction in which the rack guide moves towards or away from the rack shaft.

Additionally, according to the thirteenth solution, there is provided a steering apparatus including the rack guide device.

Advantageous Effects of Invention

According to the invention of the first solution of the present invention, the holding member that holds the disc spring is held integrally to the blocking member through frictional engagement. The disc spring, the holding member and the blocking member can easily be integrated into the single sub-assembly through the simple work of bringing them into frictional engagement with one another, and therefore, the assembling performance of the rack guide device as a whole can be improved.

According to the invention of the second solution, the holding member that holds the disc spring can be held to the blocking member via the frictional engaging member.

According to the invention of the third solution, the error in dimensional accuracy of the holding member and the blocking member can be absorbed by the elastic member that is the frictional engaging member, and therefore, the holding member can be held to the blocking member in an ensured fashion.

Additionally, according to the invention of the fourth solution, the holding member receives the load of the disc spring via the washer plate that is provided at the one end of the guide tube that guides the radial end portion (for example, the inner diameter) of the disc spring, and therefore, it is possible to restrict the occurrence of wear of the rack guide by the disc spring.

According to the invention of the fifth solution, the guide tube and the opposing portion of the blocking member can be disposed so as to overlap in the axial direction, and therefore, the rack guide device can be reduced in size in the axial direction.

Additionally, according to the invention of the sixth solution, the assembling performance of the rack guide device can be improved by making the unit including the disc spring into the sub-assembly.

According to the invention of the seventh solution, the disc spring and the holding member can easily be integrated into either of the rack guide and the blocking member so as to be made into the unit (the sub-assembly) that can be treated integrally through the simple work of bringing the guide tube and the recess portion into frictional engagement with each other by adjusting the elastic reduction in diameter of the guide tube of the holding member by increasing or decreasing the width of the slit therein. Consequently, the assembling performance of the rack guide device as a whole can be improved.

According to the invention of the eighth solution, the holding member receives the load of the disc spring via the washer plate that is provided at the one end of the guide tube that guides the inner diameter portion of the disc spring, and therefore, it is possible to restrict the occurrence of wear of the rack guide by the disc spring.

Additionally, according to the invention of the ninth solution, the holding member unit that includes the disc spring and the holding member is provided, and therefore, the assembling performance of the rack guide device as a whole is improved further.

According to the invention of the tenth solution, the compression coil spring that is interposed between the blocking member and the rack guide to bias the rack guide towards the rack shaft is used together with the disc spring, and therefore, the degree of freedom in setting the load can be improved.

According to the invention of the eleventh solution, the set load of the compression coil spring that is disposed in series with the disc spring is set smaller than the set load of the disc spring, and therefore, a two-stage load characteristic can be obtained by setting the disc spring so as to start working after the compression coil spring deflects, whereby the degree of freedom in setting the load can be improved.

Additionally, according to the invention of the twelfth solution, the maximum gap amount between the blocking member and the holding member in relation to the direction in which the rack guide moves towards or away from the rack shaft is restricted by the connecting member to thereby set the load of the disc spring desirably, and therefore, a desired two-stage load characteristic can be obtained.

According to the invention of the thirteenth solution, it is possible to provide the steering apparatus that has the superior assembling performance.

DESCRIPTION OF EMBODIMENTS

Hereinafter, referring to the accompanying drawings, embodiments of the invention will be described.

Figure 1:
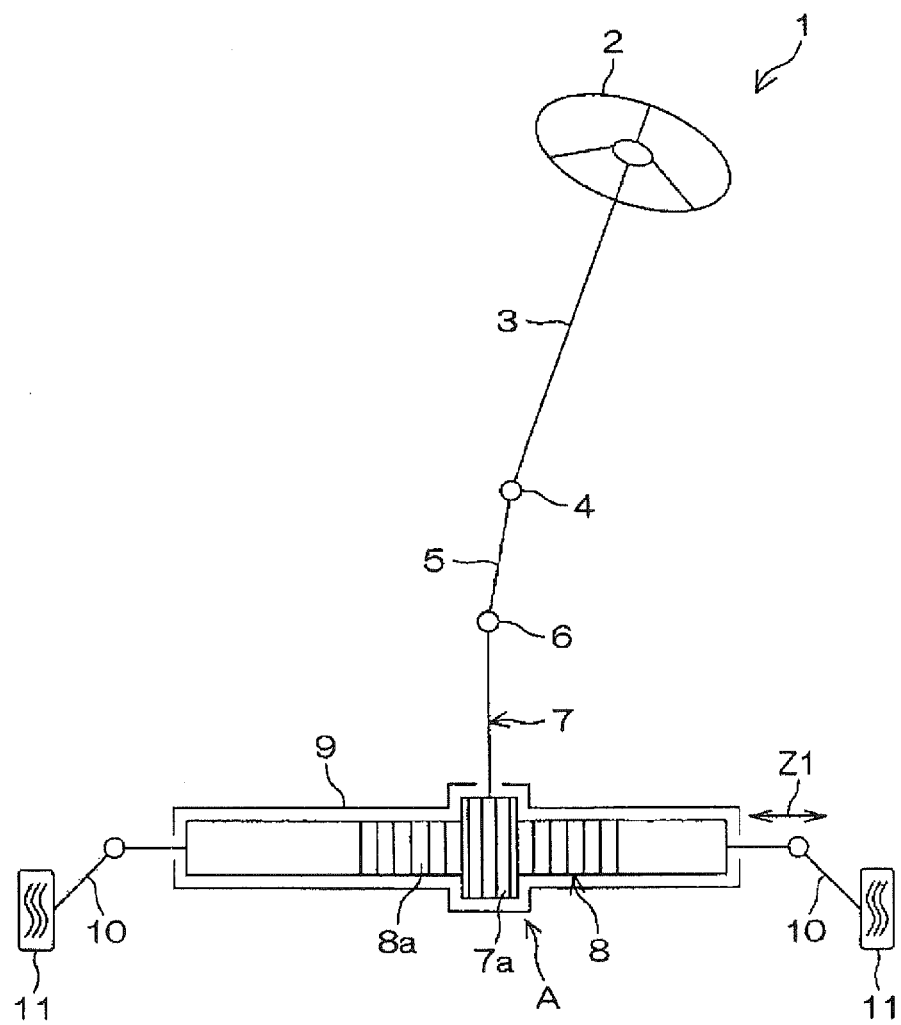
FIG. 1 is a schematic diagram showing schematically the configuration of a rack-and-pinion steering apparatus of a first embodiment of the invention.

Referring to FIG. 1, a steering apparatus 1 has a steering shaft 3 that is connected to a steering member 2 such as a steering wheel, an intermediate shaft 5 that is connected to the steering shaft 3 via a universal joint 4, a pinion shaft 7 that is connected to the intermediate shaft 5 via a universal joint 6, and a rack shaft 8 that has a rack 8a configured to mesh with a pinion 7a that is provided near an end portion of the pinion shaft 7 and that functions as a steering rack that extends in a left-to-right or transverse direction of a vehicle. A rack-and-pinion mechanism A, which is a steering mechanism, is made up of the pinion shaft 7 and the rack shaft 8.

The rack shaft 8 is supported in a rack housing 9 that is fixed to a vehicle body via a plurality of bearings, not shown, so as to reciprocate rectilinearly along an axial direction Z1. Both end portions of the rack shaft 8 project out of both ends of the rack housing 9, and tie rods 10 are connected individually to the end portions. The tie rods 10 are connected individually to corresponding steered wheels 11 via corresponding knuckle arms (not shown).

When the steering member 2 is operated to rotate the steering shaft 3, the rotation of the steering shaft 3 is converted into the rectilinear motion of the rack shaft 8 in the axial direction Z1 by the pinion 7a and the rack 8a. This achieves the turning of the steered wheels 11.

Figure 2:
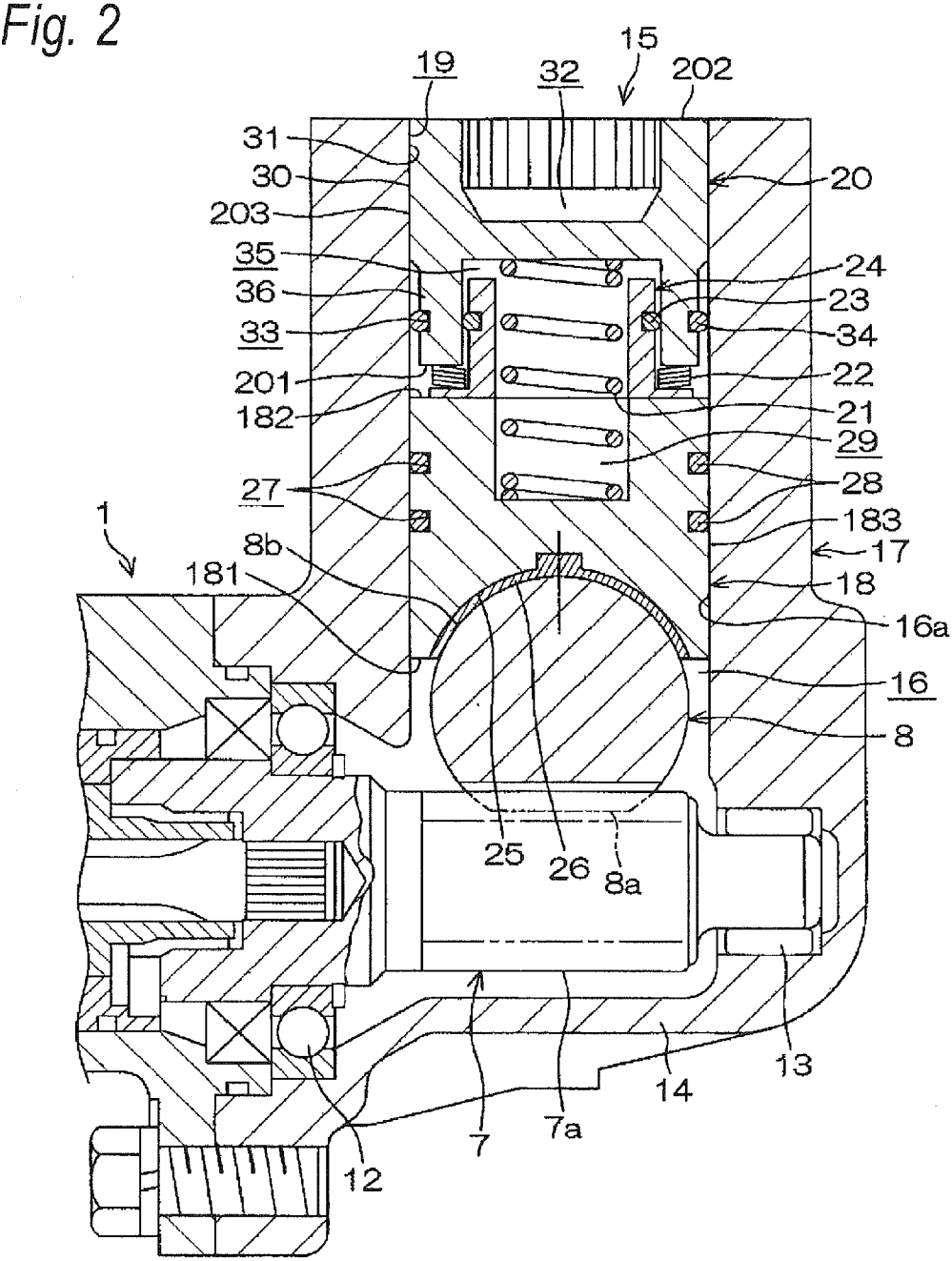
FIG. 2 is a sectional view of a main part of the steering apparatus that includes a rack guide device.

Referring to FIG. 2 that is a sectional view of a main part of the steering apparatus 1, the pinion shaft 7 is supported rotatably in a pinion housing 14 by a first bearing 12 that is made up of, for example, a ball bearing and a second bearing 13 that is made up of, for example, a cylindrical roller bearing. The pinion 7a of the pinion shaft 7 and the rack 8a of the rack shaft 8 are made to mesh with each other in the pinion housing 14.

The steering apparatus 1 is equipped with a rack guide device 15. The rack guide device 15 includes a housing 17 in which an accommodating portion 16 that is a circular hole is formed and through which the rack shaft 8 is inserted and a rack guide 18 that is accommodated in the accommodating portion 16 so as to move towards and away from the rack shaft 8 and that supports slidably a back surface 8b of the rack 8a of the rack shaft 8. Additionally, the rack guide device 15 includes a blocking member 20 that is a plug fixed to an external opening end 19 that is provided at an opposite end of the accommodating portion 16 to an end that faces the rack shaft 8, a compression coil spring 21 that is interposed between the rack guide 18 and the blocking member 20 and one or a plurality of disc springs 22 (in this embodiment, the rack guide device 15 will be described as including a plurality of disc springs). In addition, the rack guide device 15 includes a holding member 24 that holds the disc springs 22 and that is held to the blocking member 20 through frictional engagement via an annular elastic member 23 that is a frictional engaging member.

The housing 17 of the rack guide device 15 is formed integral with the pinion housing 14 through the use of a single material and is disposed at an opposite side to the pinion shaft 7 across the rack shaft 8. The pinion housing 14 and the housing 17 are produced through die casting, for example.

The rack guide 18 has a first surface 181 that faces the rack shaft 8, a second surface 182 that is provided at an opposite side to the first surface 181 and an outer circumference 183 that is made up of a cylindrical surface. A concave surface 25, having a shape that substantially coincides with a shape of the back surface 8b of the rack shaft 8, is formed on the first surface 181 of the rack guide 18. A curved sliding contact plate 26 is attached so as to follow the concave surface 25, and the sliding contact plate 26 is brought into sliding contact with the back surface 8b of the rack shaft 8. A plate having a low friction coefficient is preferably used as the sliding contact plate 26, and for example, a metal plate or a metal plate coated with a fluoroplastic can be used.

An annular elastic member 28 that is, for example, an O ring or the like is accommodated in each of a plurality of annular accommodating grooves 27 that are provided on the outer circumference 183 of the rack guide 18. An outer diameter of the rack guide 18 is made slightly smaller than an inner diameter of the accommodating portion 16. The rack guide 18 moves in a direction in which it moves towards or away from the rack shaft 8 in the accommodating portion 16 as a result of the elastic members 28 sliding on an inner circumference 16a of the accommodating portion 16. The elastic members 28 function to restrict the rack guide 18 from falling or being inclined in the accommodating portion 16.

Figure 3:
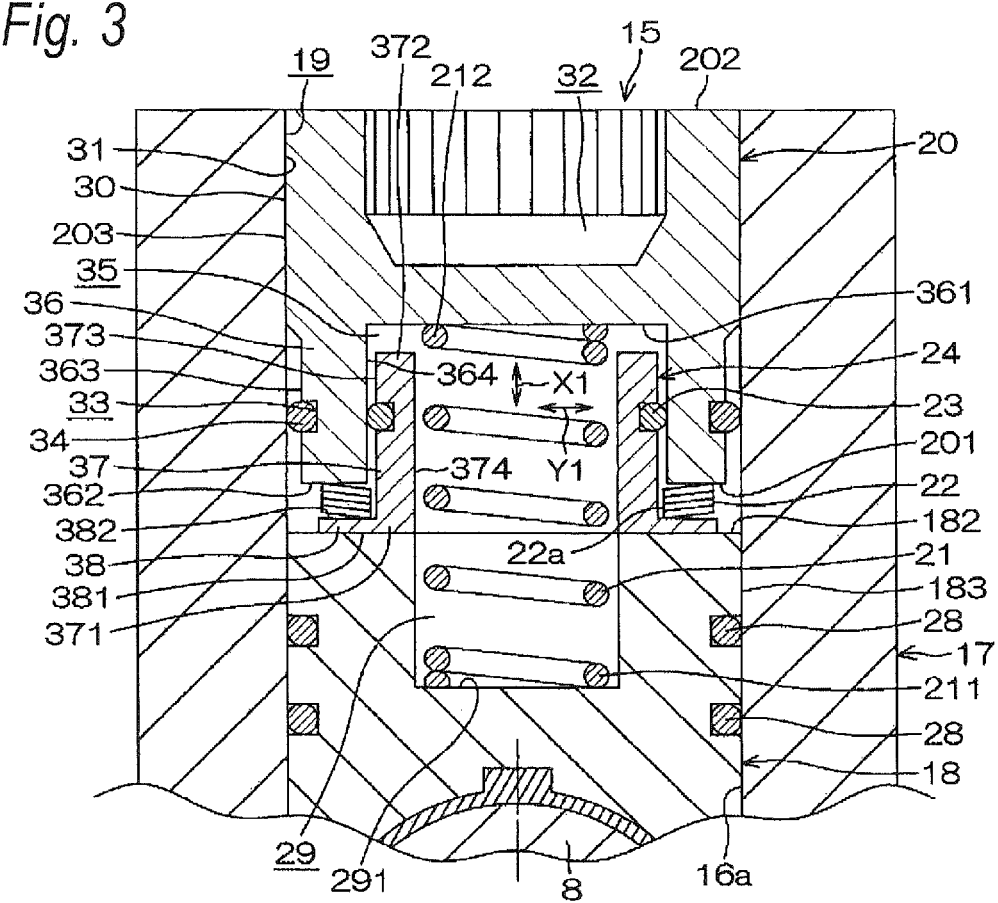
FIG. 3 is an enlarged sectional view of the rack guide device.

Referring to FIG. 3 that is an enlarged sectional view of a portion of FIG. 2, an accommodating recess portion 29 that is made up of a circular hole is provided on the second surface 182 of the rack guide 18 so as to accommodate part of the compression coil spring 21. A first end portion 211 of the compression coil spring 21 is received by a bottom 291 of the accommodating recess portion 29. An inner circumference 292 of the accommodating recess portion 29 functions to guide an outer diameter portion of the compression coil spring 21.

Referring to FIGS. 2 and 3, the blocking member 20 is made up of the plug having a first surface 201 that faces (the second surface 182 of) the rack guide 18 and a second surface 202 that is at an opposite end to the first surface 201. Namely, an external thread 30 is formed on an outer circumference 203 of the blocking member 20. On the other hand, an internal thread 31 is formed on the accommodating portion 16 over a range of a predetermined length from the external opening end 19 thereof. The external thread 30 on the blocking member 20 is screwed into the internal thread 31, whereby the blocking member 20 is fixed to the housing 17.

A tool engaging hole 32 having a polygonal section with which a tool for screwing the blocking member 20 is brought into engagement is provided on the second surface 202 of the blocking member 20. Additionally, a seal member 34 made up of an annular elastic member such as an O ring, for example, is accommodated in one or a plurality of annular accommodating grooves 33 that are provided on the outer circumference 203 (corresponding to an outer circumference 363 of a cylindrical portion 36 which will be described later) of the blocking member 20 and held in place therein. The seal member 34 functions to seal up a gap between the outer circumference 203 of the blocking member 20 and the inner circumference 16a of the accommodating portion 16.

An accommodating recess portion 35 is provided on the first surface 201 of the blocking member 20, and this accommodating recess portion 35 recedes towards the second surface 202 to accommodate part of the compression coil spring 21 and part the holding member 24. This allows the blocking member 20 to have the bottomed cylindrical portion 36 that is provided so as to surround the circumference of the accommodating recess portion 35. A second end portion 212 of the compression coil spring 21 is received by a bottom 361 (corresponding to a bottom of the accommodating recess portion 35) of the cylindrical portion 36. Namely, the compression coil spring 21 is interposed between the bottom 361 of the cylindrical portion 36 of the blocking member 20 and the bottom 291 of the accommodating recess portion 29 of the rack guide 18 in a compressed state so as to bias elastically the rack guide 18 towards the rack shaft 8.

An end face 362 (corresponding to the first surface 201 of the blocking member 20) of the cylindrical portion 36 of the blocking member 20 has an annular shape that surrounds the circumference of the accommodating recess portion 35 and functions as a seat portion that receives the disc springs 22. The holding member 24 includes a guide tube 37 that guides inner diameter portions 22a that are radial end portions of the disc springs 22 and a washer plate 38 that extends outwards in a radial direction Y1 from a first end portion 371 (corresponding to an end portion facing the rack guide 18) of the guide tube 37 in an axial direction X1 so as to receive the disc springs 22.

The disc springs 22 and the washer plate 38 are interposed between the end face 362 (the seat portion) of the cylindrical portion 36 of the blocking member 20 and the second surface 182 of the rack guide 18. The washer plate 38 is interposed between the disc springs 22 and the second surface 182 of the rack guide 18 in such a state that the washer plate 38 extends along the second surface 182 of the rack guide 18. Namely, the washer plate 38 includes a first surface 381 that extends along the second surface 182 of the rack guide 18 and a second surface 382 that is a seat surface for receiving a load of the disc springs 22. A distance between the end face 362 (the seat portion) of the cylindrical portion 36 and the second surface 382 of the washer plate 38 is made greater than a length of the plurality of disc springs 22 that are in close contact with one another.

The washer plate 38 functions to restrict the occurrence of wear of the second surface 182 of the rack guide 18 by avoiding the contact of the second surface 182 of the rack guide 18 with the disc spring 22, for example, in the case of the rack guide 18 being formed of aluminum. Because of this, the holding member 24 that includes the washer plate 38 is formed of steel or resin, for example.

Most of the guide tube 37 is inserted into the accommodating portion 35 of the blocking member 20 to be accommodated therein. The compression coil spring 21 extends through an interior of the guide tube 37. A predetermined gap is provided between an inner circumference 374 of the guide tube 37 and an outer diameter of the compression coil spring 21.

The guide tube 37 has a second end portion 372 that is an opposite end portion to the first end portion 371 where the washer plate 38 is provided to extend. A gap is provided between the second end portion 372 of the guide tube 37 and the bottom 361 of the cylindrical portion 36 in relation to a direction in which the rack guide 18 moves towards or away from the rack shaft 8 (corresponding to a depth direction of the circular hole that is the accommodating portion 16), and the gap is equal to or greater than a distance over which the rack guide 18 moves towards or away from the rack shaft 8.

An inner circumference 364 of the cylindrical portion 36 of the blocking member 20 functions as an opposing portion that faces an outer circumference 373 of the guide tube 37 with a predetermined gap defined therebetween. The elastic member 23, which is the frictional engaging member, is held by an accommodating groove 39 that is provided on the outer circumference 373 of the guide tube 37 and is in frictional engagement with the inner circumference 364 (the opposing portion) of the cylindrical portion 36. The elastic member 23 is made up of, for example, an O ring. The elastic member 23 may be or may not be elastically compressed between the inner circumference 364 of the cylindrical portion 36 and the outer circumference 373 of the guide tube 37.

Figure 4:
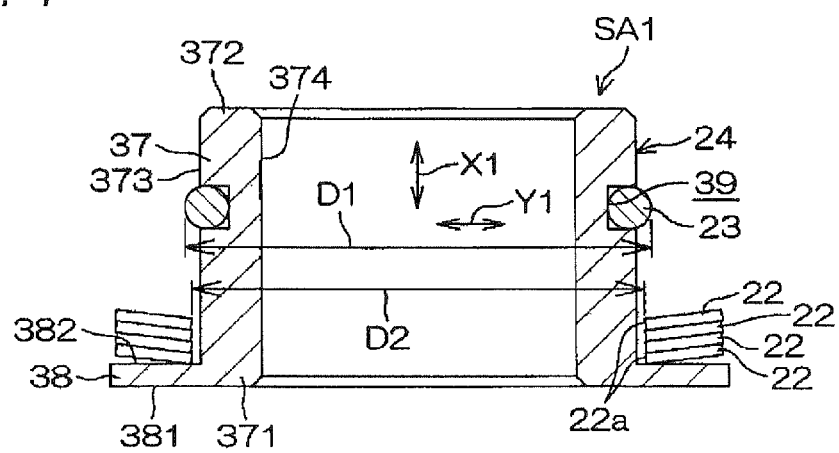
FIG. 4 is a sectional view of a first sub-assembly that includes a disc spring, a holding member and an elastic member (a frictional engaging member).

As shown in FIG. 4, the disc springs 22, the elastic member 23 (the frictional engaging member) and the holding member 24 constitute a first sub-assembly SA1 that can be treated as an integral unit. Specifically, the disc springs 22 and the elastic member 23 are disposed on the same side of the guide tube 37 in relation to the radial direction Y1 (in this embodiment, an outer side in relation to the radial direction) of the guide tube 37. Additionally, the disc springs 22 are disposed between the elastic member 23 and the washer plate 38 in relation to the axial direction X1 of the guide tube 37.

In such a state that the first sub-assembly SA1 is constituted by the members described above, when looking at it from the axial direction of the guide tube 37, part of the elastic member 23 (the frictional engaging member) and part of the disc springs 22 overlap. Namely, an outer diameter D1 of the annular elastic member 23 that is held in the accommodating groove 39 on the outer circumference 373 of the guide tube 37 of the holding member 24 is made greater than an inner diameter D2 of the disc springs 22 (D1>D2). By adopting this configuration, the disc springs 22 are restricted from being dislocated from the guide tube 37 by the elastic member 23.

Figure 5:
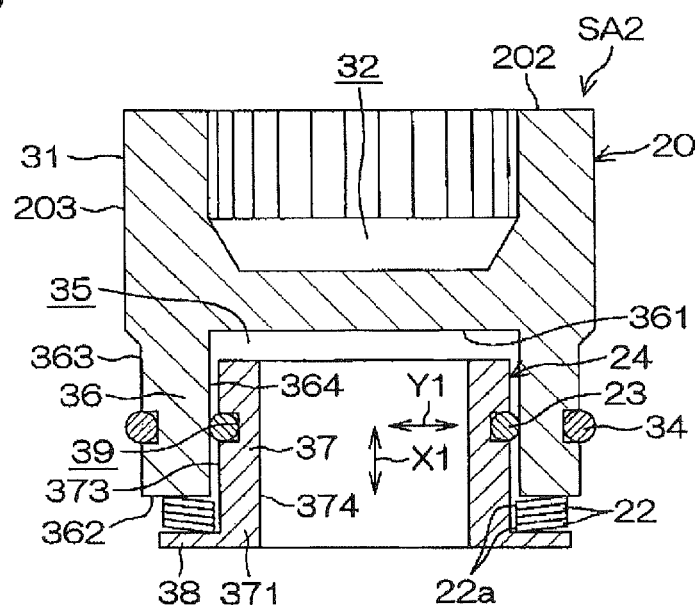
FIG. 5 is a sectional view of a second sub-assembly that includes a disc spring, a holding member, an elastic member (a frictional engaging member), and a blocking member.

As shown in FIG. 5, the disc springs 22, the elastic member 23, the holding member 24, the blocking member 20 and the seal member 34 constitute a second sub-assembly SA2 that can be treated as an integral unit as a result of the elastic member 23 (the frictional engaging member) that is held on the holding member 24 (in the accommodating groove 39 of the guide tube 37 thereof) being brought into frictional engagement with the blocking member 20 (at the inner circumference 364 of the cylindrical portion 36 thereof). The second sub-assembly SA2 is a unit sub-assembly that is larger than the first sub-assembly SA1. When assembling the second sub-assembly SA2, firstly, the first sub-assembly SA1 is assembled, whereafter the first sub-assembly SA1 is combined with the blocking member 20 to build up the second sub-assembly SA2.

According to this embodiment, the holding member 24 that holds the disc springs 22 is held integrally to the blocking member 20 through frictional engagement. The disc springs 22, the holding member 24 and the blocking member 20 can easily be integrated into the sub-assembly (corresponding to the second sub-assembly SA2) through the simple work of bringing them into frictional engagement with one another, and therefore, the assembling performance of the rack guide device 15 as a whole can be improved. Hence, the assembling performance of the steering apparatus 1 can be improved.

Additionally, in the case of the plurality of disc springs 22 being used, since the plurality of disc springs 22 that are easy to be loosened to be separated from one another are held together integrally, the plurality of disc springs 22 are preferably restricted from being decentered upon operating.

When a load is inputted into the rack guide 18 from the rack shaft 8 side to cause the holding member 24 to be displaced together with the rack guide 18, the elastic member 23, which is the frictional engaging member, slides frictionally on the blocking member 20 (at the inner circumference 364 of the cylindrical portion 36 thereof), generating a frictional resisting load. Additionally, in the case of the plurality of disc springs 22 being used, in addition to the generation of the frictional resisting load by the elastic member 23, contact surfaces of the plurality of disc springs 22 slide frictionally one on another in association with compression displacement of the disc springs 22 to generate a frictional resisting load. Since the frictional resisting loads generated by the elastic member 23 (the frictional engaging member) and the disc springs 22 contribute as an opposing load acting against the load input from the rack shaft 8 side, an overall opposing load including the opposing load by the compression coil spring 21 and the disc springs 22 and the opposing load by the frictional resisting load can be increased.

When a large load is inputted into the rack guide 18 from the rack shaft 8 side, the rack guide 18 moves together with the holding member 24 towards the blocking member 20. As this occurs, a frictional load generated when the elastic member 23 is brought into frictional engagement with the blocking member 20 can be added to a load generated by the disc springs 22 that are compressed against one another. Consequently, the opposing load can be increased so as to act against the large load. Moreover, when the rack guide 18 returns towards the rack shaft 8, the rack guide 18 can return smoothly.

Additionally, the holding member 24 that holds the disc springs 22 can be held to the blocking member 20 via the frictional engaging member (the elastic member 23).

In addition, since the elastic member 23 as the frictional engaging member is used, an error in dimension accuracy between the holding member 24 (specifically speaking, the outer circumference 373 of the guide tube 37 of the holding member 24) and the blocking member 20 (specifically, the inner circumference 364 of the cylindrical portion 36 of the blocking member 20) can be absorbed, thereby making it possible to hold the holding member 24 on the blocking member 20 in an ensured fashion.

Additionally, the holding member 24 includes the guide tube 37 that guides the inner diameter portions 22a (the radial end portions) of the disc springs 22 and the washer plate 38 that extends in the radial direction from the one end of the guide tube 37 in the axial direction X1 to receive the load of the disc springs 22. The washer plate 38 prevents the occurrence of wear of the rack guide 18(specifically, the second surface 182 of the rack guide 18) by the disc springs 22.

Additionally, the blocking member 20 includes the opposing portion (the inner circumference 364 of the cylindrical portion 36) that faces the outer circumference 373 of the guide tube 37, and the elastic member 23 (the frictional engaging member) is interposed between the outer circumference 373 of the guide tube 37 and the opposing portion (the inner circumference 364 of the cylindrical portion 36) of the blocking member 20. Consequently, since the guide tube 37 and the opposing portion (the inner circumference 364 of the cylindrical portion 36) of the blocking member 20 can be disposed so as to overlap in the axial direction X1, the rack guide device 15 can be made small in size in the axial direction X1(corresponding to the depth direction of the circular hole as the accommodating portion 16).

In addition, the disc springs 22 and the elastic member 23 are disposed on the same side of the guide tube 37 in relation to the radial direction Y1 (in this embodiment, an outer side in relation to the radial direction) of the guide tube 37. In such a state that the disc springs 22 are disposed between the elastic member 23 and the washer plate 38 in relation to the axial direction X1 of the guide tube 37, when looking at them from the axial direction X1 of the guide tube 37, part of the elastic member 23 (the frictional engaging member) and part of the disc springs 22 overlap. Namely, an outer diameter D1 of the annular elastic member 23 that is held in the accommodating groove 39 on the outer circumference 373 of the guide tube 37 of the holding member 24 is made greater than an inner diameter D2 of the disc springs 22 (D1>D2). Since this can restrict the dislocation of the disc springs 22 from the guide tube 37, the unit including the disc springs 22, the elastic member 23 (the frictional engaging member) and the holding member 24 can be configured as the sub-assembly (corresponding to the first sub-assembly SA1) that can be treated integrally. Consequently, the assembling performance of the rack guide device 15 can be improved further.

Additionally, since the compression coil spring 21 that is interposed between the blocking member 20 and the rack guide 18 to bias the rack guide 18 towards the rack shaft 8 is used together with the disc springs 22, the degree of freedom in setting the loads can be improved.

<Second Embodiment>

Figure 6:
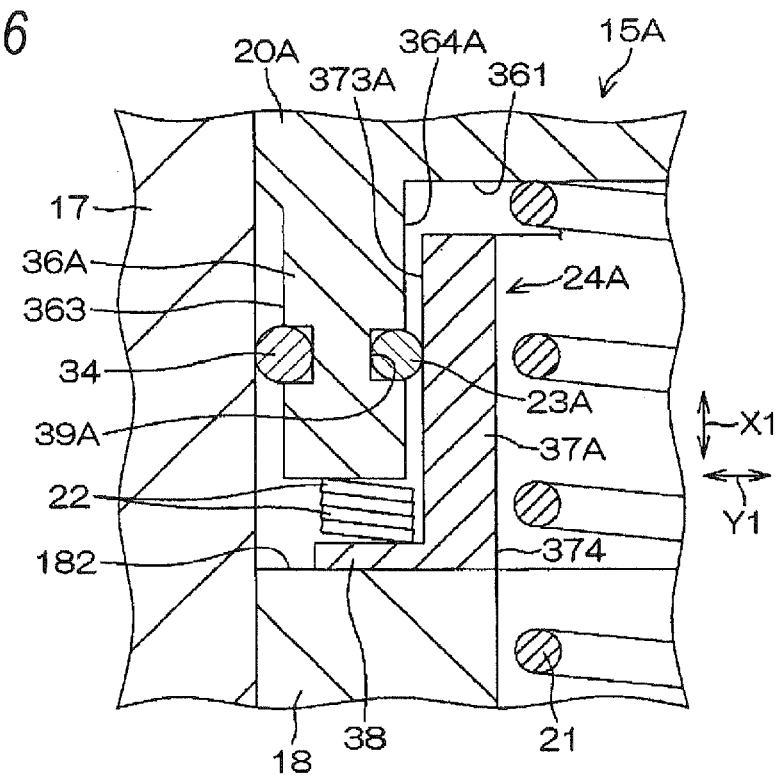
FIG. 6 is a sectional view of a main part of a rack guide device according to a second embodiment of the invention, showing a modified example made to the first embodiment shown in FIG. 3.

Next, FIG. 6 is a sectional view of a main part of a rack guide device 15A according to a second embodiment of the invention. The second embodiment shown in FIG. 6 differs from the first embodiment shown in FIG. 3 mainly in the following point.

Namely, in the first embodiment shown in FIG. 3, the elastic member 23 as the frictional engaging member is held in the accommodating groove 39 that is provided on the outer circumference 373 of the guide tube 37 of the holding member 24 so as to be in frictional engagement with the inner circumference 364 of the cylindrical portion 36 of the blocking member 20.

In contrast with this, in the second embodiment shown in FIG. 6, an elastic member 23A as a frictional engaging member may be held in an accommodating groove 39A that is provided on an inner circumference 364A of a cylindrical portion 36A of a blocking member 20A so as to be in frictional engagement with an outer circumference 373A of a guide tube 37A of a holding member 24A. Like reference numerals to those given to the constituent elements of the first embodiment are given to like constituent elements of the second embodiment shown in FIG. 6 to those of the first embodiment.

In the second embodiment, since the elastic member 23A is held on the blocking member 20A, they cannot be configured as a first sub-assembly like the first sub-assembly SA1 of the first embodiment shown in FIG. 4. The same working effect as that of the first embodiment can also be provided in the second embodiment excluding the fact that the first sub-assembly cannot be configured.

<Third Embodiment>

Figure 7:
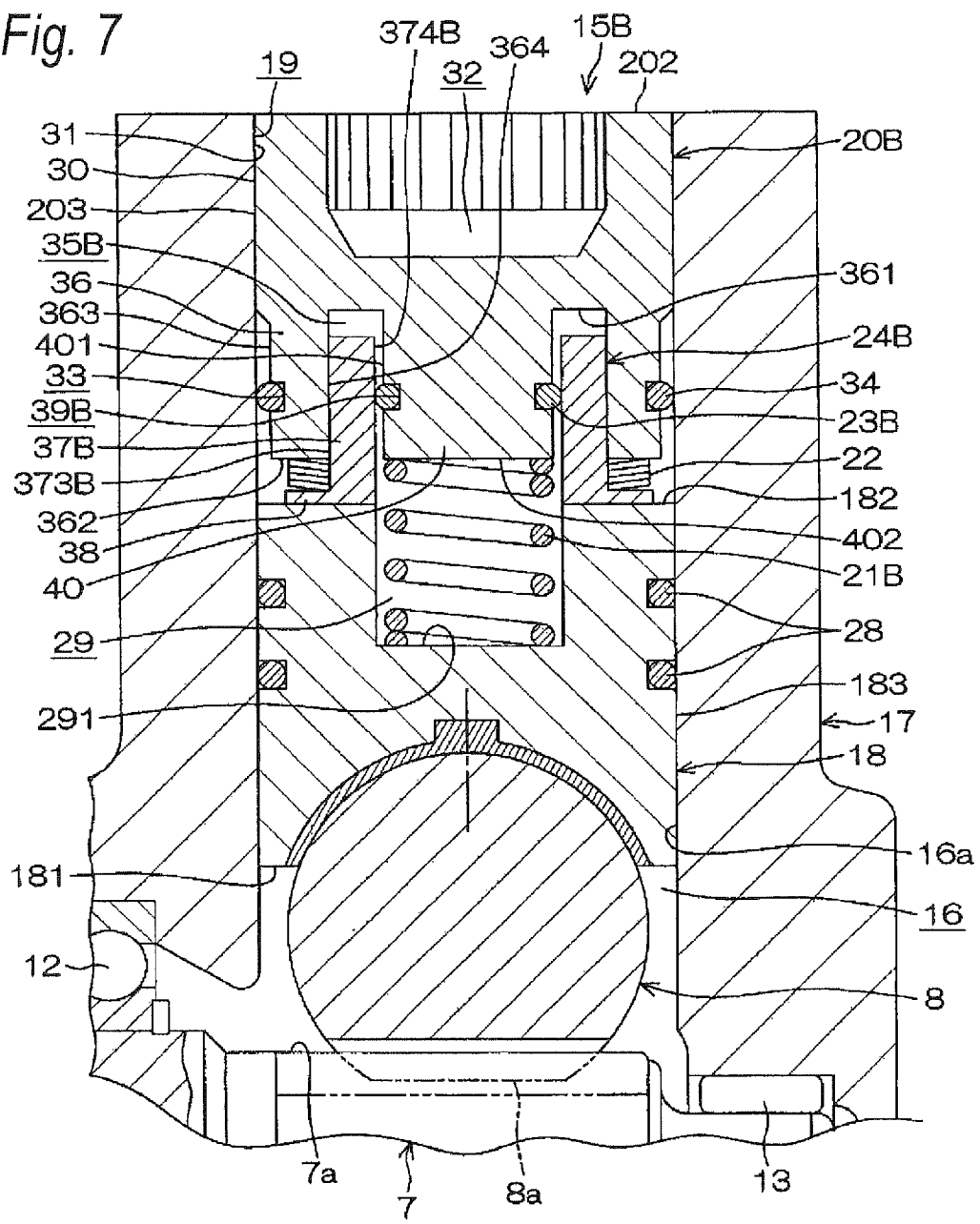
FIG. 7 is a sectional view of a main part of a rack guide device according to a third embodiment of the invention.

Next, FIG. 7 is a sectional view of a main part of a rack guide device according to a third embodiment of the invention. Referring to FIG. 7, the third embodiment differs from the first embodiment shown in FIG. 3 mainly in that by providing a projecting portion 40 on a blocking member 20B so as to project into an interior of a cylindrical portion 36, an annular accommodating recess portion 35B is formed between the projecting portion 40 and the cylindrical portion 36. An elastic member 23B (for example, an O ring) as a frictional engaging member is accommodated in an accommodating groove 39B formed on an outer circumference 401 of the projecting portion 40 to be held therein. The elastic member 23B is in frictional engagement with an inner circumference 374B of a guide tube 37B of the holding member 24B.

An outer circumference 373B of the guide tube 37B of the holding member 24B fits in an inner circumference 364 of the cylindrical portion 36 so as to move in an axial direction. The projecting portion 40 has an end face 402 that faces a bottom 291 of an accommodating recess portion 29 of a rack guide 18. A compression coil spring 21B is interposed between the end face 402 of the projecting portion 40 and the bottom 291 of the accommodating recess portion 29 in a compressed state so as to bias the rack guide 18 towards a rack shaft 8.

Like reference numerals to those given to the constituent elements of the first embodiment shown in FIG. 3 are given to like constituent elements of the third embodiment shown in FIG. 7 to those of the first embodiment shown in FIG. 3.

In the third embodiment, since the elastic member 23B is held on the blocking member 20B, they cannot be configured as a first sub-assembly like the first sub-assembly SA1 of the first embodiment shown in FIG. 4. The same working effect as that of the first embodiment can also be provided in the thrid embodiment excluding the fact that the first sub-assembly cannot be configured.

Figure 8:
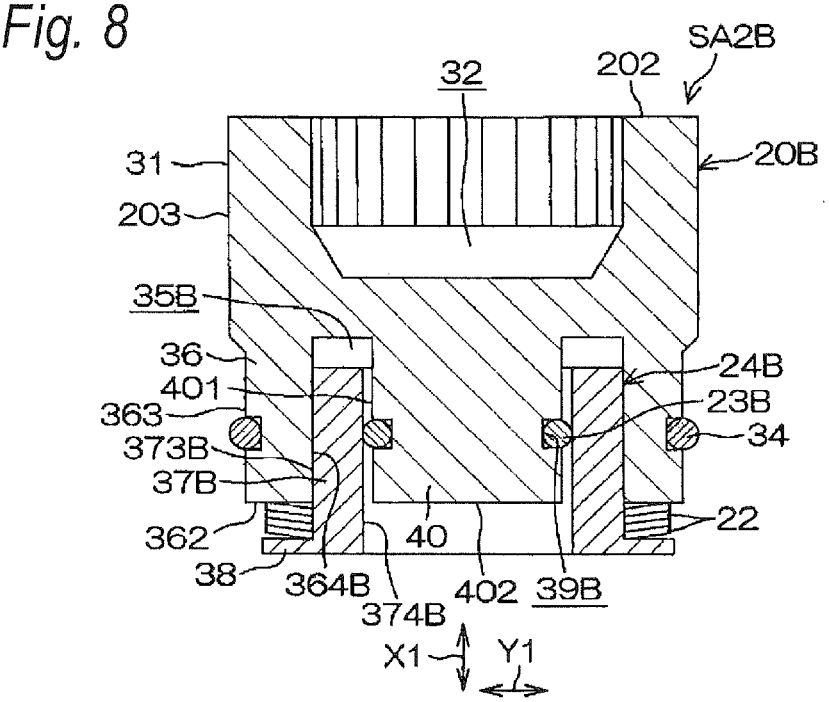
FIG. 8 is a sectional view of a second sub-assembly that includes a disc spring, a holding member, an elastic member (a frictional engaging member), and a blocking member in the third embodiment shown in FIG. 7.

For example, in this embodiment, too, as shown in FIG. 8, disc springs 22, the elastic member 23B, the holding member 24B, the blocking member 20B and a seal member 34 constitute a second sub-assembly SA2B that can be treated as an integral unit as a result of the elastic member 23B (the frictional engaging member) that is held on the blocking member 20B being brought into frictional engagement with the holding member 24B.

Namely, according to this embodiment, the disc springs 22, the holding member 24B and the blocking member 20B can easily be integrated into the sub-assembly (corresponding to the second sub-assembly SA2B) through the simple work of causing the holding member 24B that holds the disc springs 22 to be held integrally on the blocking member 20B through frictional engagement, and therefore, the assembling performance of the rack guide device 15B as a whole can be improved.

Additionally, since the guide tube 37B of the holding member 24B is inserted into the annular accommodating recess portion 35B, the guide tube 37 can be prevented from falling or being inclined so that the holding member 24B can smoothly be displaced in an axial direction X1.

<Fourth Embodiment>

Figure 9:
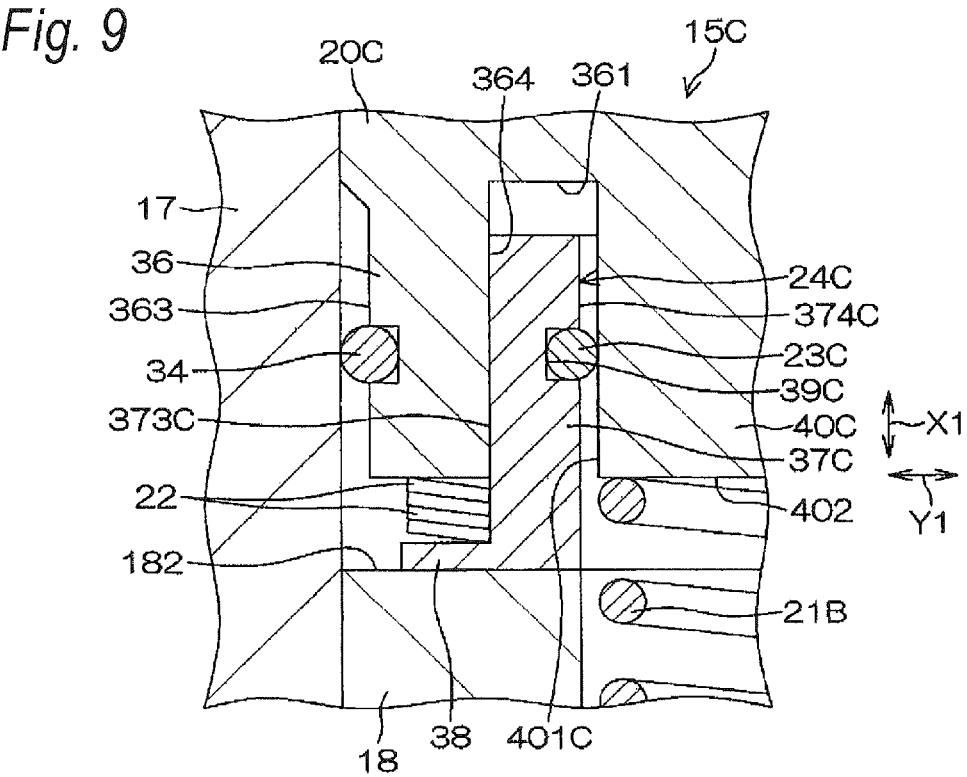
FIG. 9 is a sectional view of a rack guide device according to a fourth embodiment of the invention, showing a modified example made to the third embodiment shown in FIG. 7.

FIG. 9 is a sectional view of a main part of a rack guide device according to a fourth embodiment of the invention. The fourth embodiment shown in FIG. 9 differs from the third embodiment shown in FIG. 7 mainly in the following point.

Namely, in the third embodiment shown in FIG. 7, the elastic member 23B as the frictional engaging member is held in the accommodating groove 39B that is provided on the outer circumference 401 of the projecting portion 40 of the blocking member 20B so as to be in frictional engagement with the inner circumference 374B of the guide tube 37B of the holding member 24B.

In contrast with this, in the fourth embodiment shown in FIG. 9, an elastic member 23C is held in an accommodating groove 39C that is provided on an inner circumference 374C of a guide tube 37C of the holding member 24C so as to be in frictional engagement with an outer circumference 401 C of a projecting portion 40C of a blocking member 20C. An outer circumference 373C of the guide tube 37C fits in an inner circumference 364 of a cylindrical portion 36 so as to move in an axial direction X1. Like reference numerals to those given to the constituent elements of the third embodiment shown in FIG. 7 are given to like constituent elements of the fourth embodiment shown in FIG. 9 to those of the third embodiment shown in FIG. 7.

According to the fourth embodiment, since the elastic member 23C is held on the inner circumference 374C of the guide tube 37C of the holding member 24C, they cannot be configured as a first sub-assembly like the first sub-assembly SA1 of the first embodiment shown in FIG. 4. The same working effect as that of the first embodiment can also be provided in the fourth embodiment excluding the fact that the first sub-assembly cannot be configured.

<Fifth Embodiment>

Figure 10:
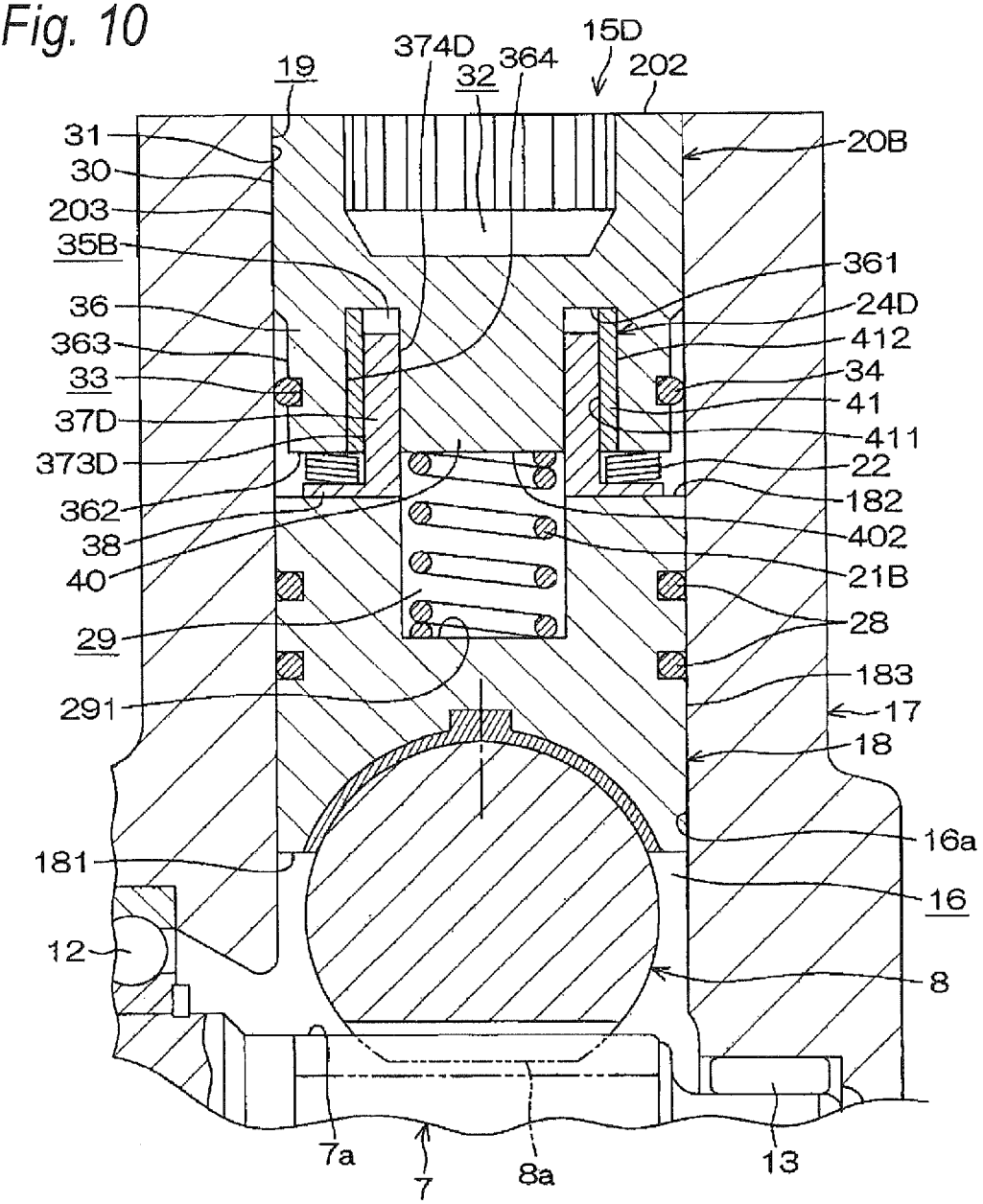
FIG. 10 is a sectional view of a main part of a rack guide device according to a fifth embodiment of the invention.

FIG. 10 is a sectional view of a main part of a rack guide device according to a fifth embodiment of the invention. The fifth embodiment shown in FIG. 10 differs from the third embodiment shown in FIG. 7 mainly in the following point.

Namely, in the third embodiment shown in FIG. 7, the elastic member 23B that is held on the outer circumference 401 of the projecting portion 40 of the blocking member 20B (in the accommodating groove 39B) is in frictional engagement with the inner circumference 374B of the guide tube 37B of the holding member 24B.

In contrast with this, in the fifth embodiment shown in FIG. 10, an outer circumference 412 of a rolled bush 41 as a frictional engaging member is press fitted in an inner circumference 364 of a cylindrical portion 36 of a blocking member 20B to be fixed in place. An inner circumference 411 of the rolled bush 41 is in frictional engagement with an outer circumference 373D of a guide tube 37D of a holding member 24D. An inner circumference 374D of the guide tube 37D fits on an outer circumference 401 of a projecting portion 40 so as to move in an axial direction X1.

The inner circumference 411 of the rolled bush 41 may be formed of a metallic layer as a frictional engaging layer, as long as the inner circumference 411 is allowed to be brought into frictional engagement with the outer circumference 373D of the guide tube 37D. The inner circumference 411 of the rolled bush 41 may be formed of a resin layer as a frictional engaging layer having a radial elasticity so that the rolled bush 41 functions as an elastic member.

Like reference numerals to those given to the constituent elements of the third embodiment shown in FIG. 7 are given to like constituent elements of the fifth embodiment shown in FIG. 10 to those of the third embodiment shown in FIG. 7.

Figure 11:
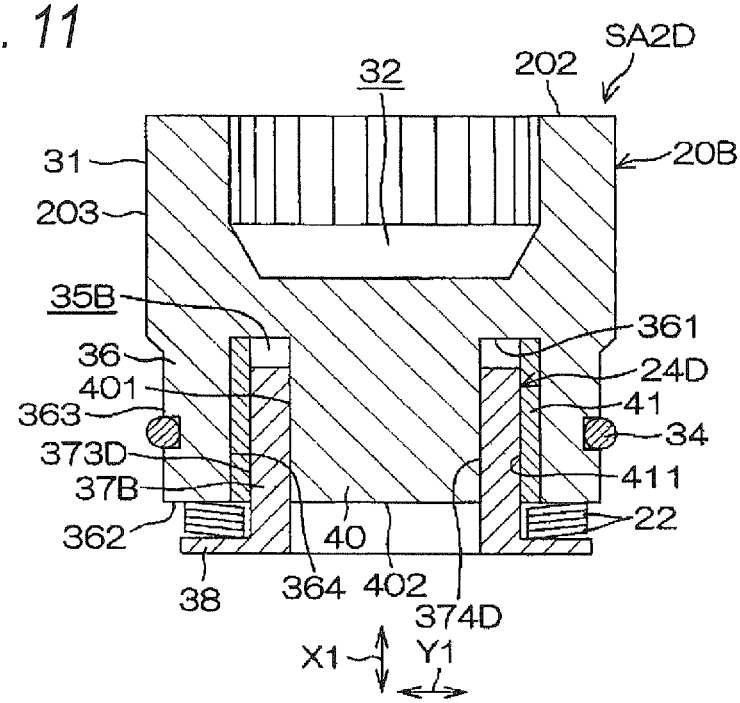
FIG. 11 is a sectional view of a second sub-assembly that includes a disc spring, a holding member, an elastic member (a frictional engaging member), and a blocking member in the fifth embodiment shown in FIG. 10.

In this embodiment, too, as shown in FIG. 11, as a result of the rolled bush 41 (the frictional member, the elastic member) held on the blocking member 20B being brought into frictional engagement with the holding member 24D, disc springs 22, the rolled bush 41, the holding member 24D, the blocking member 20B and a seal member 34 constitute a second sub-assembly SA2D that can be treated as an integral unit.

Namely, according to this embodiment, the disc springs 22, the holding member 24D and the blocking member 20B can easily be integrated into the sub-assembly (corresponding to the second sub-assembly SA2D) through the simple work of causing the holding member 24D that holds the disc springs 22 to be held integrally on the blocking member 20B through frictional engagement, and therefore, the assembling performance of the rack guide device 15D as a whole can be improved.

<Sixth Embodiment>

Figure 12:
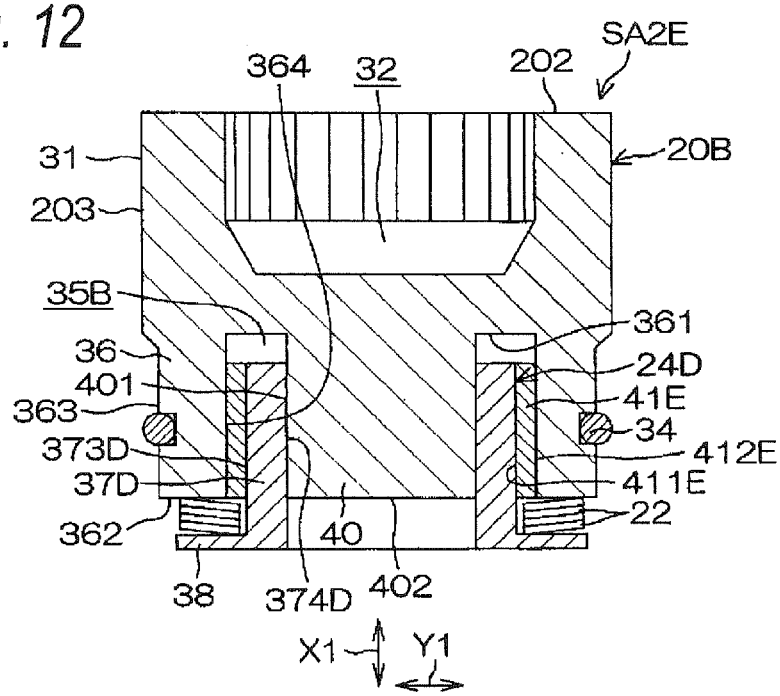
FIG. 12 is a sectional view of a second sub-assembly according to a sixth embodiment of the invention.
Figure 13:
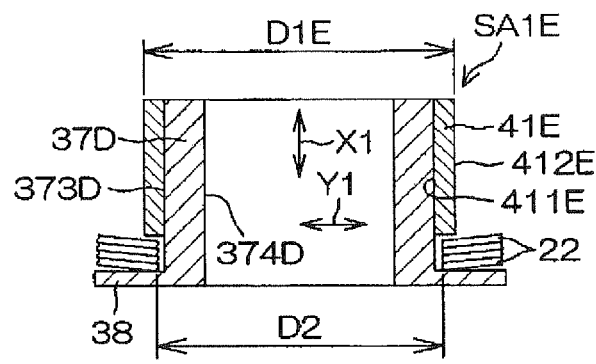
FIG. 13 is a sectional view of a first sub-assembly that is included in the second sub-assembly in the sixth embodiment shown in FIG. 12.

FIGS. 12 and 13 show a second sub-assembly SA2E and a first sub-assembly SA1 E of a sixth embodiment of the invention, respectively. The sixth embodiment of the invention shown differs from the fifth embodiment shown in FIGS. 10 and 11 in the following point.

Namely, in the fifth embodiment shown in FIG. 11, the rolled bush 41 is held on the blocking member 20B through press fitting so as to be in frictional engagement with the holding member 24D.

In contrast with this, in the sixth embodiment shown in FIG. 12, a rolled bush 41E as a frictional engaging member is held on a holding member 24D through press fitting so as to be in frictional engagement with a blocking member 20B. Specifically, an inner circumference 411E of the rolled bush 41E is held on an outer circumference 373D of a guide tube 37D of the holding member 24D through press fitting. Additionally, an outer circumference 412E of the rolled bush 41E is in frictional engagement with an inner circumference 364 of a cylindrical portion 36 of the blocking member 20B. This configures a second sub-assembly SA2E that includes disc springs 22, the holding member 24D, the rolled bush 41E, the blocking member 20B and a seal member 34.

In addition, as shown in FIG. 13, an outer diameter D1E of the rolled bush 41E that is held on the outer circumference 373D of the guide tube 37D is made greater than an inner diameter D2 of the disc springs 22 that surround the outer circumference 373D of the guide tube 37D (D1E>D2), and therefore, the dislocation of the disc springs 22 from the guide tube 37D can be restricted by the rolled bush 41E. This can configure a first sub-assembly SA1E that includes the disc springs 22, the rolled bush 41 E and the holding member 24D.

<Seventh Embodiment>

Figure 14:
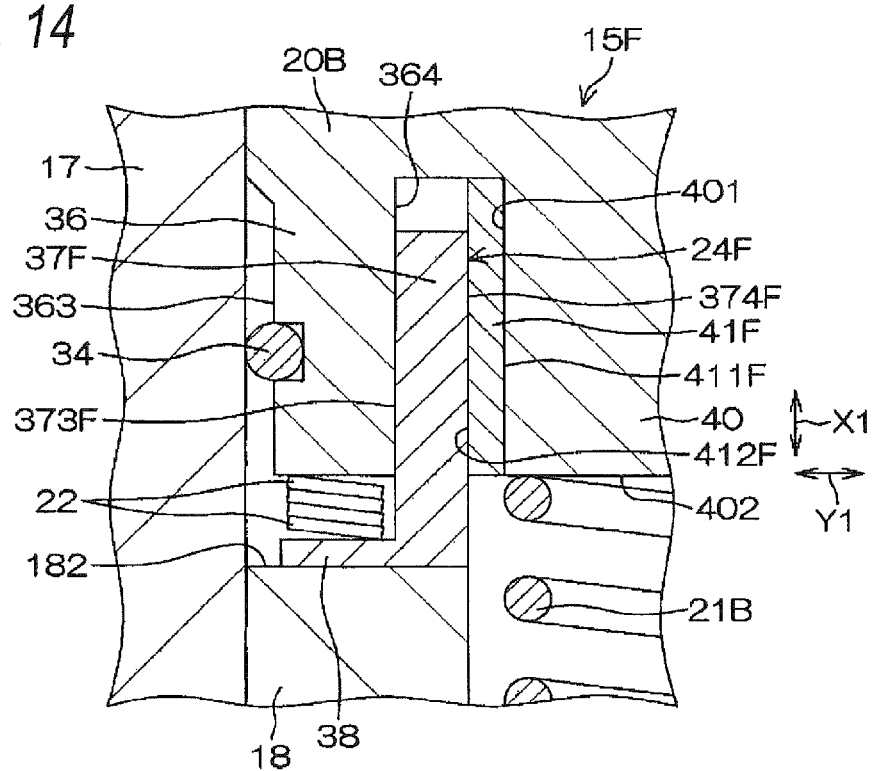
FIG. 14 is a sectional view of a main part of a rack guide device according to a seventh embodiment of the invention, showing a modified example made to the fifth embodiment shown in FIG. 10.

FIG. 14 is a sectional view of a main part of a rack guide device 15F according to a seventh embodiment of the invention. The seventh embodiment shown in FIG. 14 differs from the fifth embodiment shown in FIG. 10 mainly in the following point.

Namely, in the rack guide device 15D of the fifth embodiment shown in FIG. 10, the rolled bush 41 as the frictional engaging member is held on the inner circumference 364 of the cylindrical portion 36 of the blocking member 20B so as to be in frictional engagement with the outer circumference 373D of the guide tube 37D of the holding member 24D.

In contrast with this, in the rack guide device 15F of the seventh embodiment shown in FIG. 14, a rolled bush 41F is provided which functions as a frictional engaging member that is held on an outer circumference 401 of a projecting portion 40. Specifically, an inner circumference 411F of the rolled bush 41F is fitted on the outer circumference 401 of the projecting portion 40 to be held thereon through press fitting. An outer circumference 412F of the rolled bush 41F is in frictional engagement with an inner circumference 374F of a guide tube 37F of a holding member 24F. An outer circumference 373F of the guide tube 37F fits in an inner circumference 364 of a cylindrical portion 36 so as to move in an axial direction X1.

Like reference numerals to those given to the constituent elements of the fifth embodiment shown in FIG. 10 are given to like constituent elements of the seventh embodiment shown in FIG. 14 to those of the fifth embodiment shown in FIG. 10. This seventh embodiment can provide the same working effect as that of the fifth embodiment shown in FIG. 10.

<Eighth Embodiment>

Figure 15:
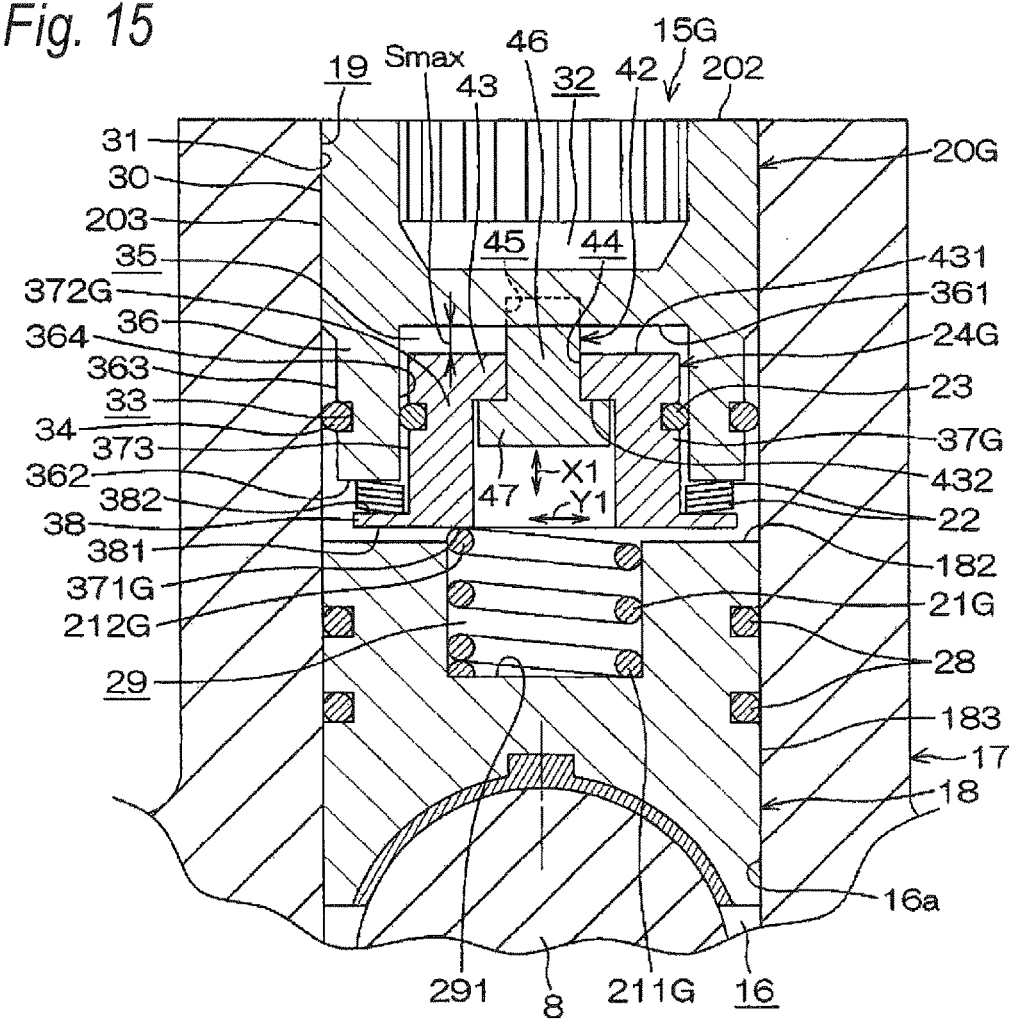
FIG. 15 is a sectional view of a main part of a rack guide device according to an eighth embodiment of the invention.
Figure 16:
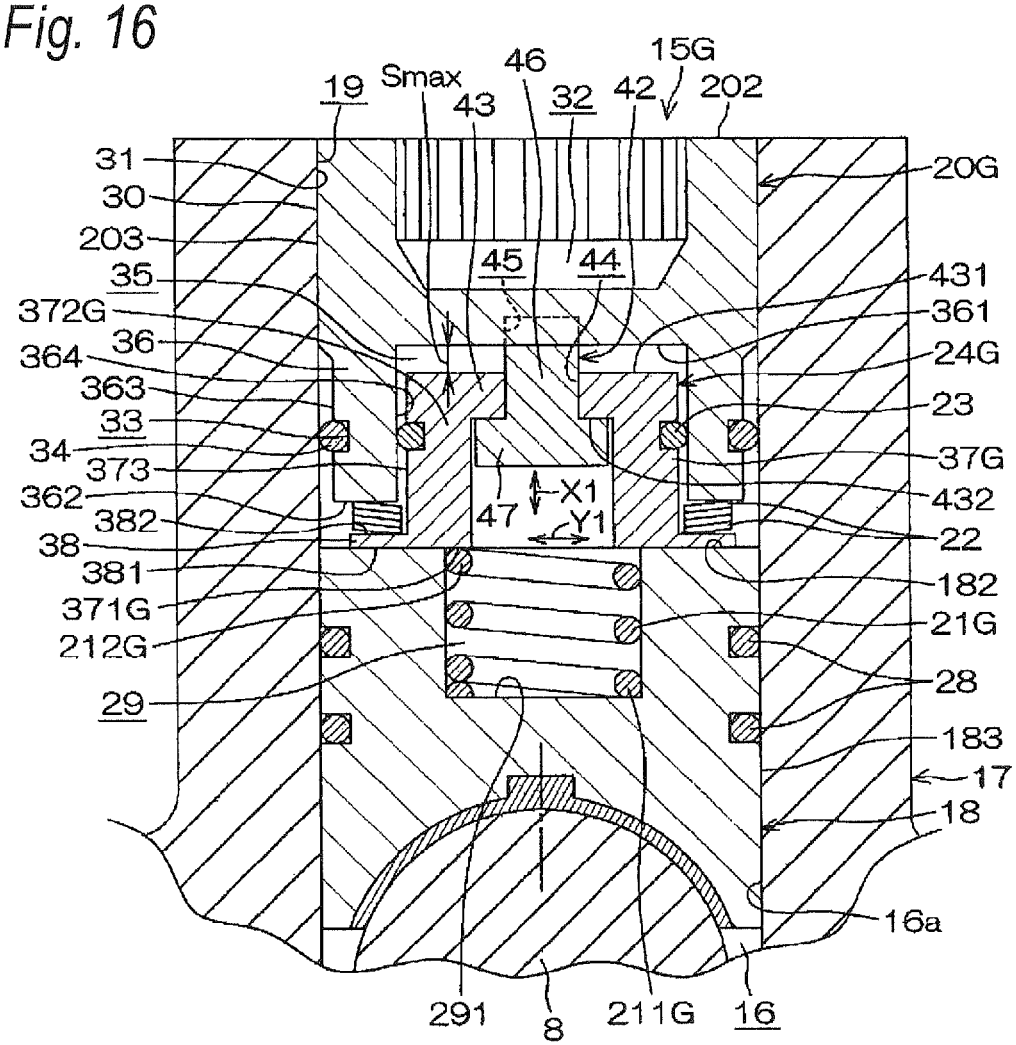
FIG. 16 shows a state in which only a compression coil spring deflects, whereby the rack guide moves a predetermined amount towards a blocking member from the state shown in FIG. 15.
Figure 17:
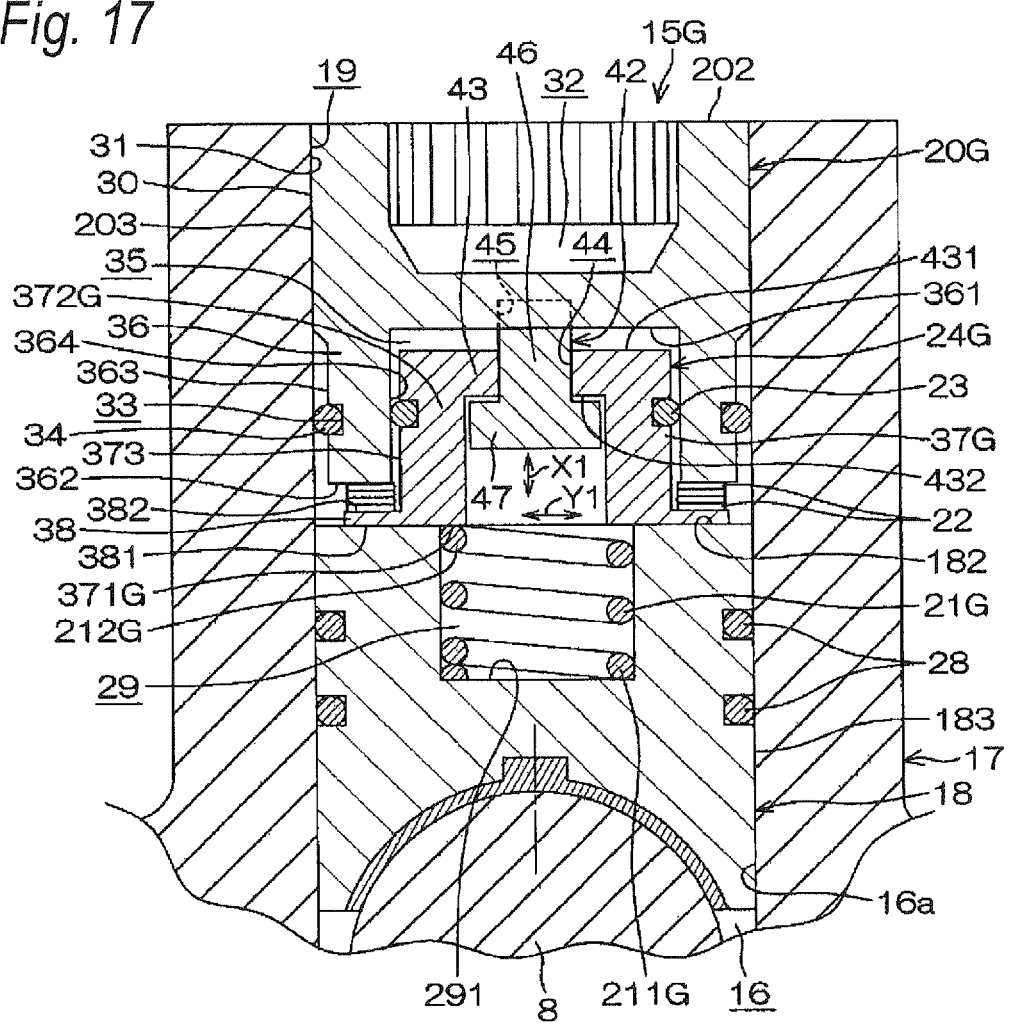
FIG. 17 shows a state in which a disc spring deflects, whereby the rack guide moves further towards the blocking member from the state shown in FIG. 16.

Next, FIGS. 15 to 17 are sectional views of a rack guide device 15G according to an eighth embodiment of the invention. Referring to FIG. 15, the eighth embodiment differs from the first embodiment shown in FIG. 3 mainly in the following point.

Namely, in the first embodiment shown in FIG. 3, the compression coil spring 21 and the disc springs 22 are interposed between the blocking member 20 and the rack guide 18 while being aligned parallel radially. In contrast with this, in this embodiment, a compression coil spring 21G and disc springs 22 are interposed between a blocking member and a rack guide 18 while being aligned in series axially.

Namely, a holding member 24G is interposed between the blocking member and the rack guide 18. The disc springs 22 are interposed between an end face 362 of a cylindrical portion 36 of the blocking member 20G and a second surface 382 of a washer plate 38 of the holding member 24G. The compression coil spring 21G is interposed between a bottom 291 of an accommodating recess portion 29 of the rack guide 18 and a first end portion 371G of a guide tube 37G of the holding member 24G in an elastically compressed state. A first end portion 211G of the compression coil spring 21G is received by the bottom 291 of the accommodating recess portion 29, and a second end portion 212G of the compression coil spring 21 G is received by the first end portion 371 G of the guide tube 37G of the holding member 24G.

Additionally, the rack guide device 15G includes a connecting member 42 that connects the holding member 24G to the blocking member 20G so as to restrict a maximum gap amount Smax between the blocking member 20G and the holding member 24G in relation to a direction in which the rack guide 18 moves towards or away from a rack shaft 8 (corresponding to an axial direction X1 of the guide tube 37G).

Specifically, a second end portion 372G of the guide tube 37G of the holding member 24G is covered by a gap restrict plate 43 (corresponding to a bottom plate of the guide tube 37G) that faces a bottom 361 of the cylindrical portion 36 of the blocking member 20G. The connecting member 42 is made up of, for example, a bolt. The connecting member 42 extends axially and slidably through an insertion hole 44 that is formed in the gap restrict plate 43 and includes a screw shaft 46 that is fixedly screwed into a threaded hole 45 in the bottom 361 of the cylindrical portion 36 of the blocking member 20G and a head portion 47 that is provided at one end of the screw shaft 46.

The gap restrict plate 43 includes a first surface 431 that functions as a gap restrict surface that faces the bottom 361 of the cylindrical portion 36 of the blocking member 20G and a second surface 432 that is at an opposite end to the first surface 431. The maximum gap amount Smax between the first surface (the gap restrict surface) of the gap restrict plate 43 and the bottom 361 of the cylindrical portion is restricted with the head portion 47 of the connecting member 42 being in abutment with the second surface 432 of the gap restrict plate 43.

Additionally, the disc springs 22 are preloaded, and a set load of the disc springs 22 is made higher than a set load of the compression coil spring 21G. Consequently, only the compression coil spring 21G extends or contracts as the rack guide 18 moves towards or away from the rack shaft 8 at a normal time when the load that is inputted from the rack shaft 8 side is at a normal level. Namely, the rack guide 18 is displaced between a state shown in FIG. 15 where a gap is formed between a second surface 182 of the rack guide 18 and a first surface 381 of a washer plate 38 of the holding member 24G and a state shown in FIG. 16 where the second surface 182 of the rack guide 18 is brought into close contact with the first surface 381 of the washer plate 38 of the holding member 24G.

Figure 18:
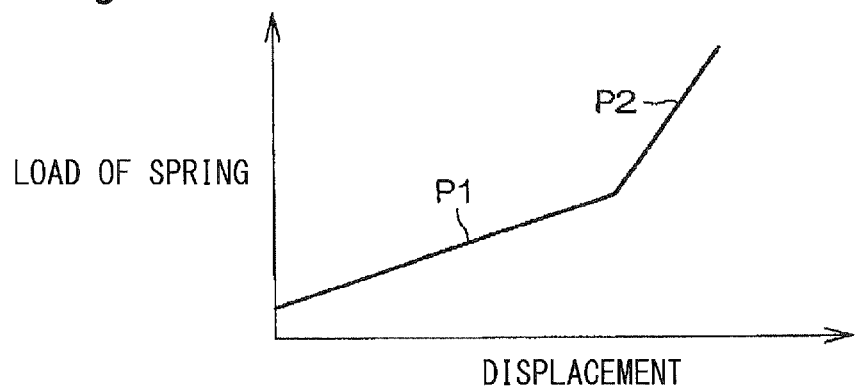
FIG. 18 is a graph showing a relationship between displacement and load when the rack guide is displaced from the state shown in FIG. 15 to the state shown in FIG. 17.

In addition, when a large load that exceeds the normal level is inputted from the rack shaft 8 side, the rack guide 18 and the holding member 24G moves together, whereby the disc springs 22 are compressed to be displaced. For example, there occurs a case where the disc springs 22 are compressed to be displaced to such an extent that the disc springs 22 are brought into close contact with each other as shown in FIG. 17. Because of this, as shown in FIG. 18, as a characteristic of a composite spring made up of the compression coil spring 21G and the disc springs 22, it is possible to obtain a two-stage load characteristic that is a combination of a first characteristic portion P1 where only the compression spring is displaced and a second characteristic portion P2 where only disc springs are displaced. Additionally, the two-stage load characteristic can be tuned to a desirable one by setting the maximum gap amount Smax accordingly.

<Ninth Embodiment>

In the first to eighth embodiments, the annular elastic members are used as the elastic members that provide the frictional engaging members. In a ninth embodiment, an elastic member that is not annular may be used as an elastic member that provides a frictional engaging member.

Figure 19:
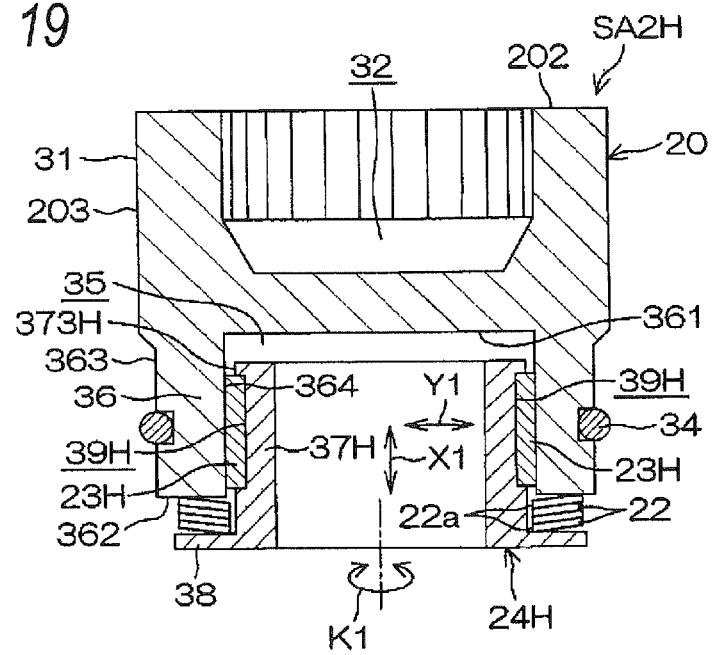
FIG. 19 is a sectional view of a second sub-assembly according to a ninth embodiment of the invention.
Figure 20:
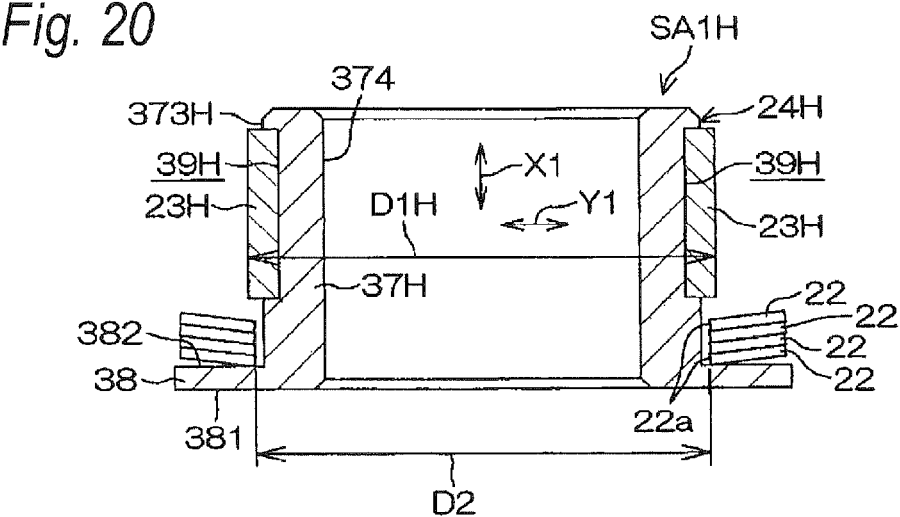
FIG. 20 is a sectional view of a first sub-assembly that is included in the second sub-assembly in the ninth embodiment shown in FIG. 19.

Namely, FIGS. 19 and 20 show a second sub-assembly SA2H and a first sub-assembly SA1H of the ninth embodiment of the invention, respectively. As shown in FIGS. 19 and 20, as an elastic member that provides a frictional engaging member, a plurality of rubber or resin elastic rods 23H that extend in an axial direction X1 of a guide tube 37H of a holding member 24H are disposed at equal intervals in a circumferential direction K1 of the guide tube 37H. Each elastic rod 23H is in frictional engagement with an inner circumference 364 (an opposing portion) of a cylindrical portion 36 of a blocking member 20.

Accommodating grooves 39H that extend in the axial direction X1 are formed on an outer circumference 373H of the guide tube 37H at equal intervals in the circumferential direction K1, and the corresponding elastic rods 23H are accommodated and held in the accommodating grooves 39H so formed. The elastic rods 23H that are held in the accommodating grooves 39H are restricted from moving relative to the guide tube 37H in the axial direction X1. Additionally, a diameter D1H of a circle that circumscribes the plurality of elastic rods 23H is made greater than an inner diameter D2 of disc springs 22 (D1H>D2), whereby the dislocation of the disc springs 22 from the holding member 24H is restricted by the plurality of elastic rods 23H.

Although not shown, as a modified example to the embodiment shown in FIGS. 19 and 20, elastic rods may be accommodated to be held in accommodating grooves that are provided on an inner circumference of a cylindrical portion of a blocking member so as to be in frictional engagement with an outer circumference of a guide tube.

<Tenth Embodiment>

In the embodiments described heretofore (the first to ninth embodiments), the holding member is held indirectly on the blocking member via the frictional engaging member. In contrast with this, in a second sub-assembly SA2J of a tenth embodiment shown in FIG. 21 that is a modified example to, for example, the first embodiment shown in FIG. 5, a holding member 24j may be formed from, for example, an elastic resin, and the holding member 24J may be brought into direct frictional engagement with a blocking member 20 to thereby be held thereon.

Namely, an outer circumference 373J, which is made up of a cylindrical surface, of a guide tube 37J of the holding member 24J may be fitted (through press fitting) in an inner circumference 364 of a cylindrical portion 36 of the blocking member 20 in an elastically compressed state. The holding member 24J is held directly by the blocking member 20 through the frictional engagement of the holding member 24J with the blocking member 20.

Figure 21:
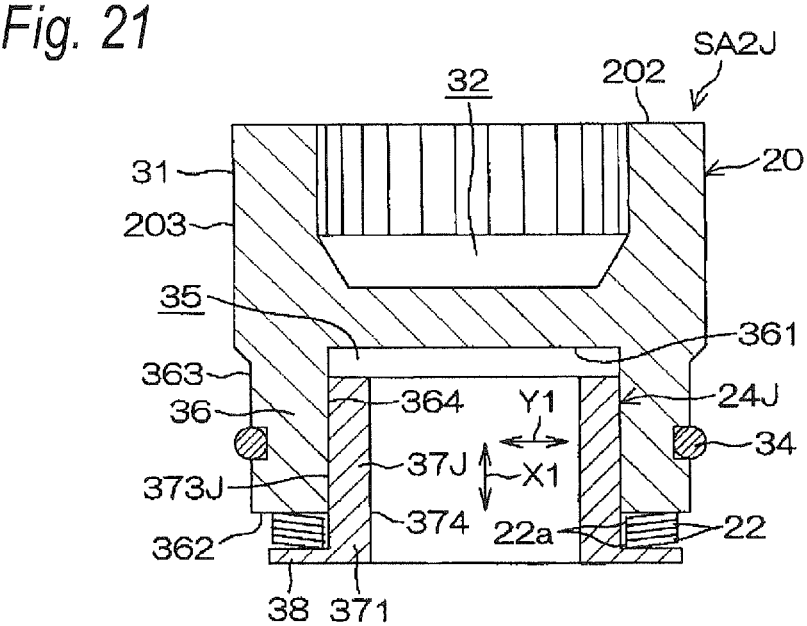
FIG. 21 is a sectional view of a second sub-assembly according to a tenth embodiment of the invention.

Like reference numerals to those given to the constituent elements of the first embodiment shown in FIG. 5 are given to like constituent elements of the tenth embodiment shown in FIG. 21 to those of the first embodiment shown in FIG. 5. This tenth embodiment can provide the same working effect as that of the first embodiment shown in FIG. 5. Further, according to the tenth embodiment, no frictional engaging member needs to be provided separately from the holding member 24J. Consequently, the construction can be simplified.

<Eleventh Embodiment>

Figure 22:
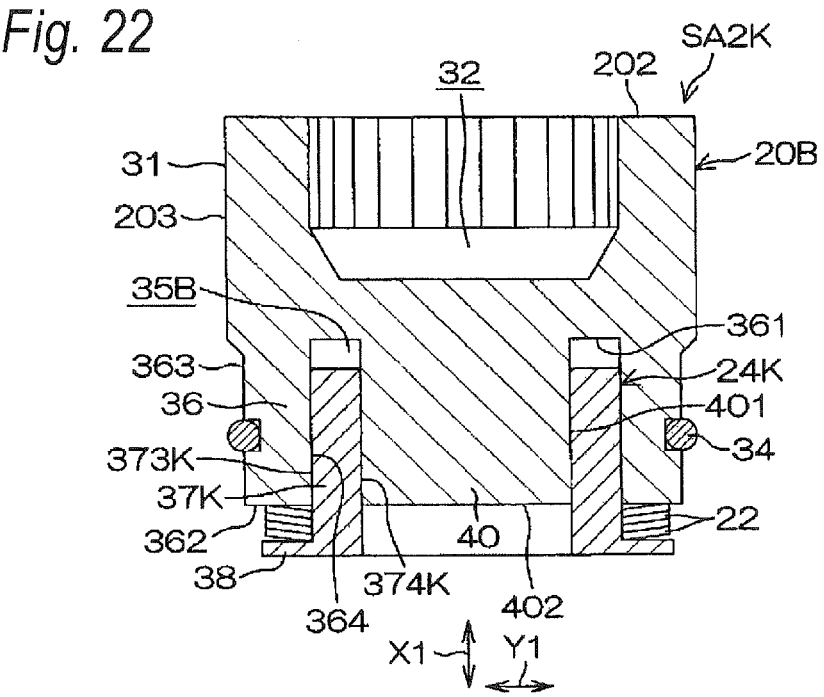
FIG. 22 is a sectional view of a second sub-assembly according to an eleventh embodiment of the invention.

An eleventh embodiment shown in FIG. 22 shows a modified example to the fifth embodiment shown in FIG. 11. Namely, in a second sub-assembly SA2K of the eleventh embodiment shown in FIG. 22, a holding member 24K is formed from, for example, an elastic resin. At least one of an outer circumference 373K and an inner circumference 374K of a guide tube 37K of the holding member 24K is brought into direct frictional engagement with an inner circumference 364 of a corresponding cylindrical portion 36 of a blocking member 20B and an outer circumference 401 of a projecting portion 40 to thereby be held thereon.

Namely, at least one of the outer circumference 373K and the inner circumference 374K of the guide tube 37K of the holding member 24K fits in the inner circumference 364 of the corresponding cylindrical portion 36 (through press fitting) and fits on the outer circumference 401 of the projecting portion 40 (through press fitting) in an elastically compressed state. The holding member 24K is held directly by the blocking member 20B with a frictional engaging force of the holding member 24K with the blocking member 20B.

Like reference numerals to those given to the constituent elements of the fifth embodiment shown in FIG. 11 are given to like constituent elements of the eleventh embodiment shown in FIG. 22 to those of the fifth embodiment shown in FIG. 11. This eleventh embodiment can provide the same working effect as that of the fifth embodiment shown in FIG. 11. Further, according to the eleventh embodiment, no frictional engaging member needs to be provided separately from the holding member 24K. Consequently, the construction can be simplified. In the eleventh embodiment, either of the outer circumference 373K and the inner circumference 374K of the guide tube 37K of the holding member 24K may fit in or on a corresponding mating surface through movable fit (loose fit) or may face the corresponding mating surface with a gap defined therebetween.

<Twelfth Embodiment>

A twelfth embodiment shown in FIGS. 23 to 27 shows a modified example to the tenth embodiment shown in FIG. 21.

Figure 23:
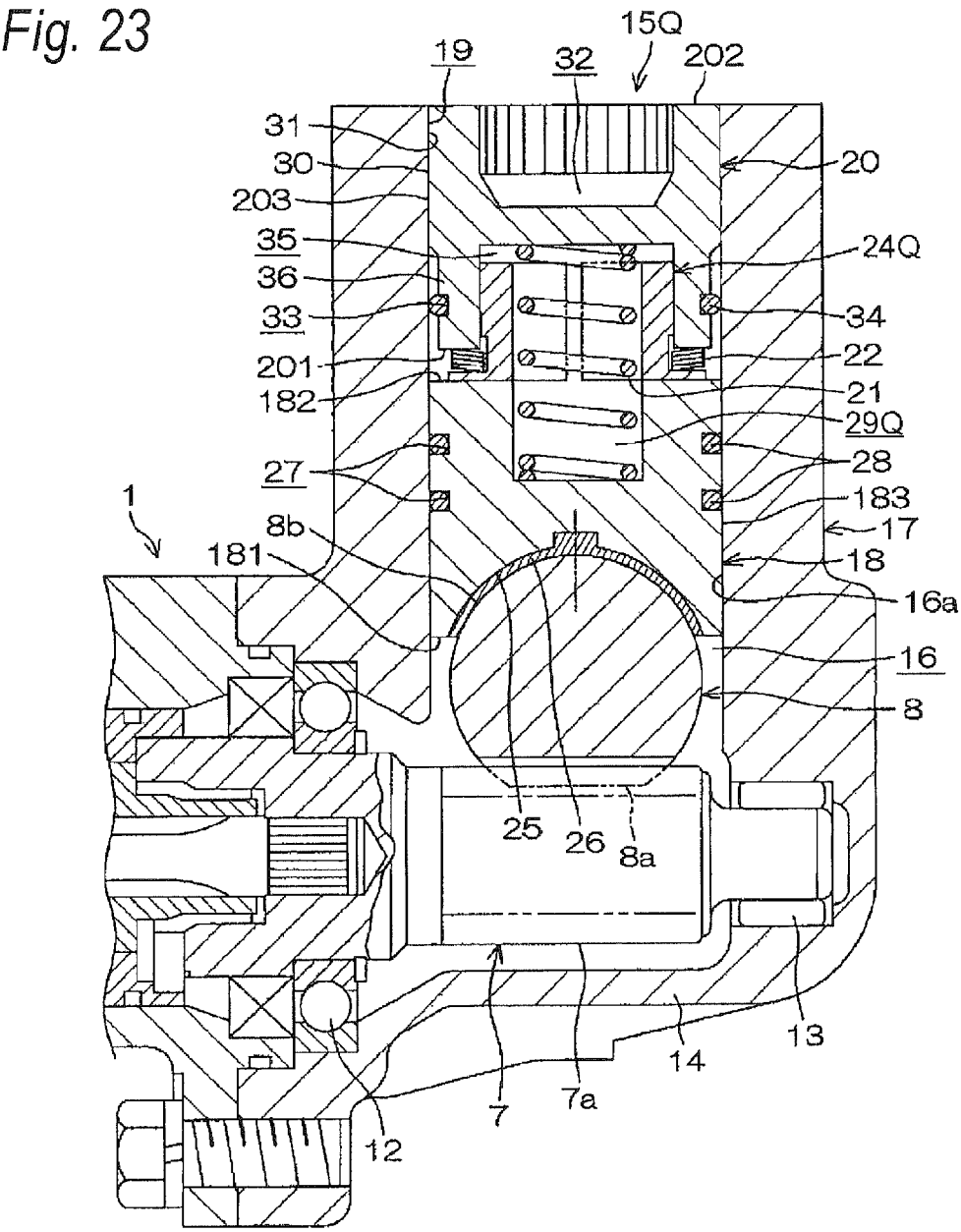
FIG. 23 is a sectional view of a main part of a steering apparatus that includes a rack guide device of a twelfth embodiment.
Figure 24:
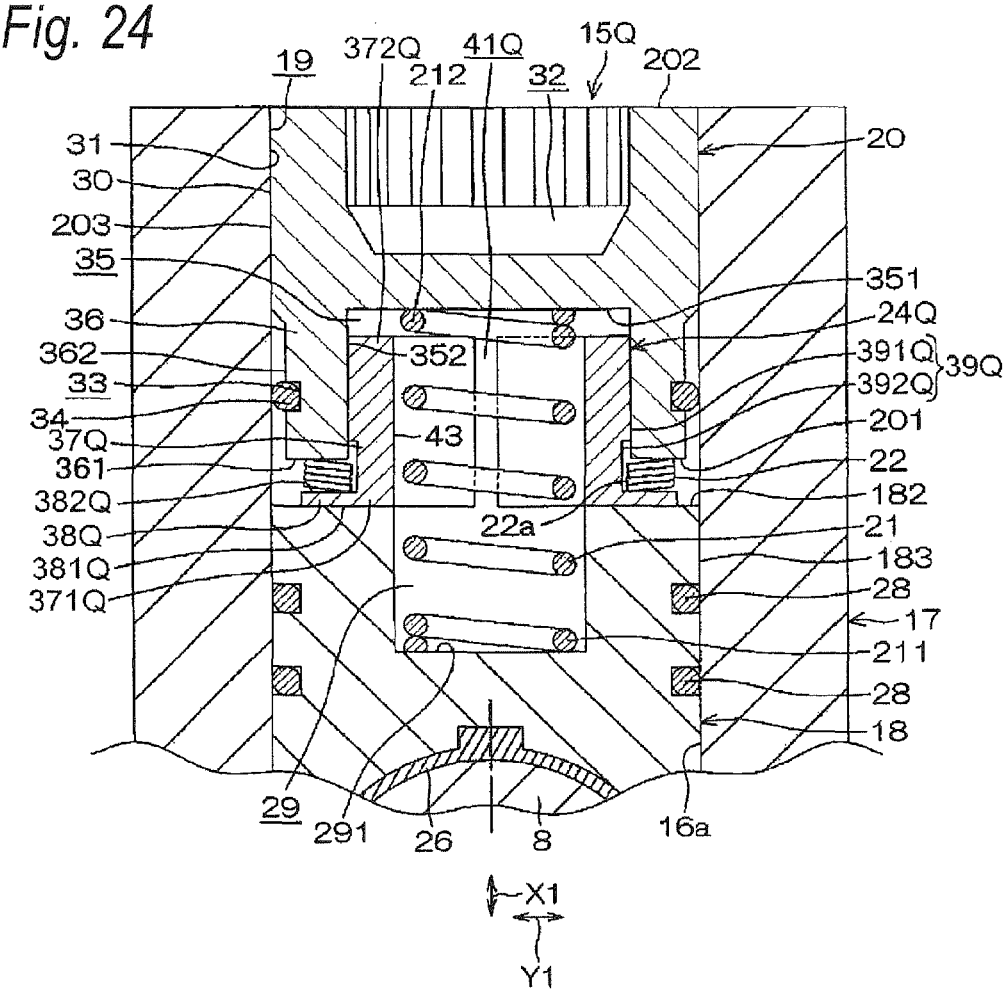
FIG. 24 is an enlarged sectional view of a main part of the rack guide device according to the twelfth embodiment of the invention.
Figure 25:
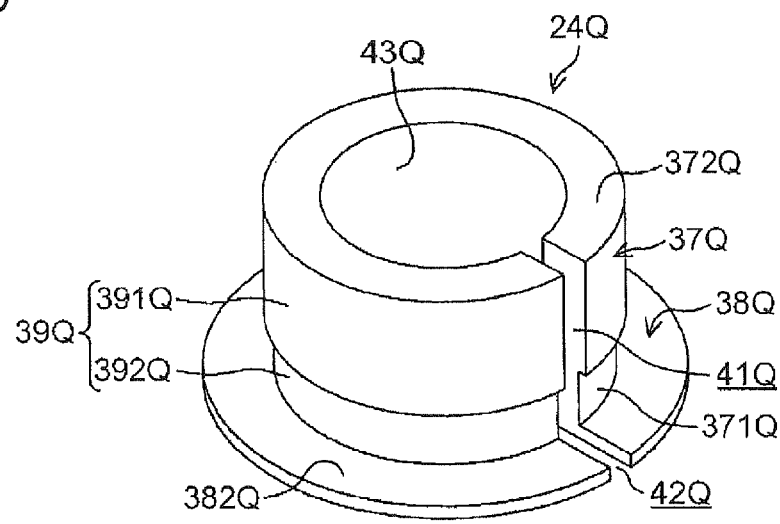
FIG. 25 is a perspective view of a holding member of the twelfth embodiment.
Figure 26:
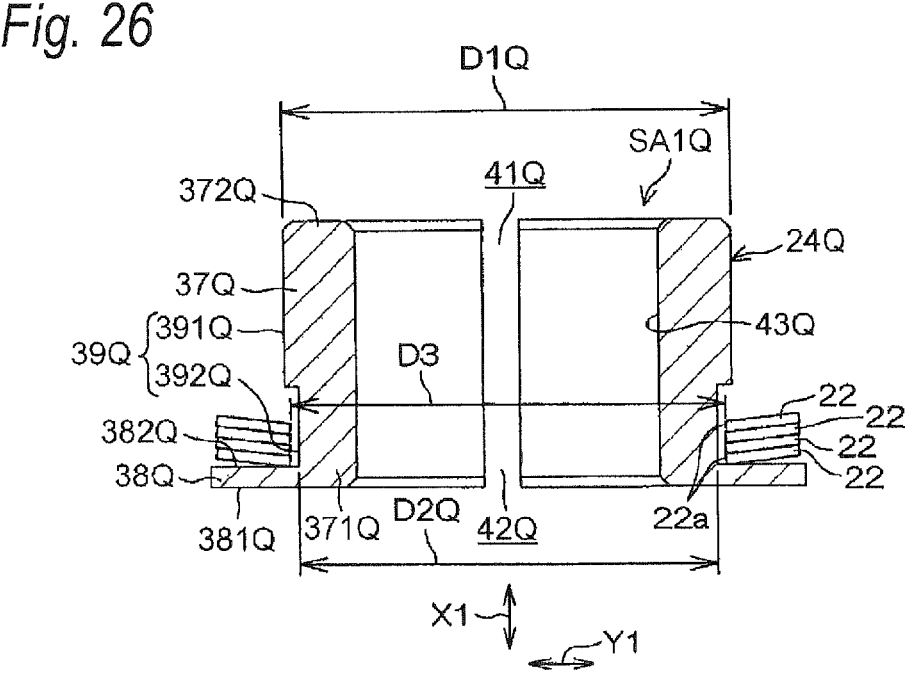
FIG. 26 is a sectional view of a holding member unit (a first sub-assembly) that includes disc springs and a holding member in the twelfth embodiment.
Figure 27:
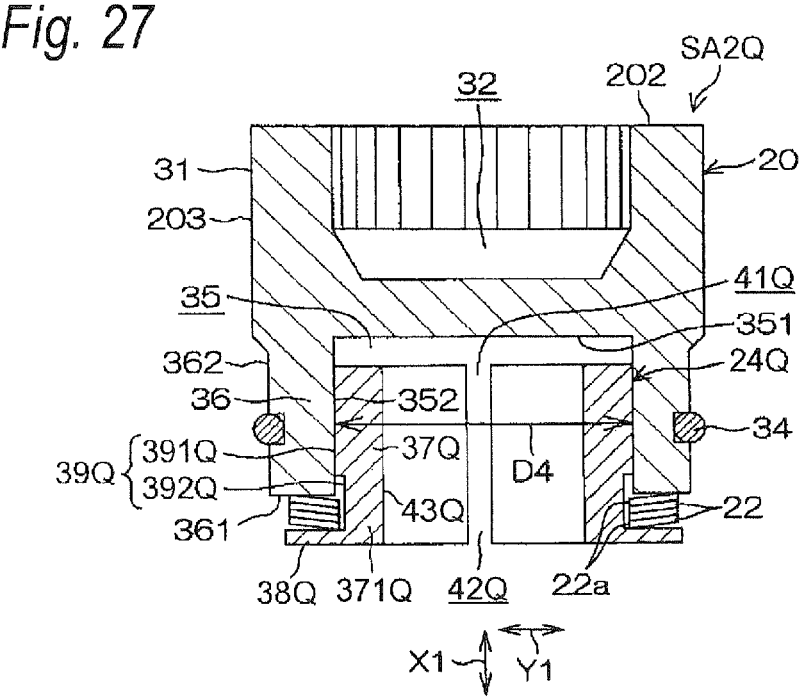
FIG. 27 is a sectional view of a holding member unit (a second sub-assembly) that includes the disc springs, the holding member and a blocking member in the twelfth embodiment.

FIG. 23 is a sectional view of a main part of a steering apparatus that includes a rack guide device of a twelfth embodiment. FIG. 24 is an enlarged sectional view of a main part of the rack guide device according to the twelfth embodiment of the invention. FIG. 25 is a perspective view of a holding member of the twelfth embodiment. FIG. 26 is a sectional view of a holding member unit (a first sub-assembly) that includes disc springs and the holding member in the twelfth embodiment. FIG. 27 is a sectional view of a holding member unit (a second sub-assembly) that includes the disc springs, the holding member and a blocking member in the twelfth embodiment.

Like reference numerals to those given to the constituent elements of the tenth embodiment shown in FIG. 21 are given to like constituent elements of the twelfth embodiment shown in FIGS. 23 to 27 to those of the tenth embodiment shown in FIG. 21.

This embodiment differs from the tenth embodiment shown in FIG. 21 mainly in that a slit is provided in a guide tube 37Q of a holding member 24Q. Additionally, although the outer diameter of the guide tube 37J of the holding member 24J is smaller than the inner diameter of the disc springs 22 in the tenth embodiment, the guide tube 37Q of this embodiment has a first portion 391Q having an outer diameter that is greater than an inner diameter of the disc springs 22.

Referring to FIGS. 24 and 25, the holding member 24Q includes the guide tube 37Q that guides inner diameter portions 22a that are radial end portions of the disc springs 22 and a washer plate 38Q that extends outwards in a radial direction Y1 from a first end portion 371Q (corresponding to an end portion facing a rack guide 18) of the guide tube 37Q in an axial direction X1 so as to receive the disc springs 22.

An outer circumference 39Q of the guide tube 37Q has a first portion 391Q that is brought into frictional engagement with an inner circumference 352 of a recess portion 35 and a second portion 392Q that guides the inner diameter portions 22a of the disc springs 22. The second portion 392Q is disposed between the first portion 391Q and the washer plate 38Q. A first slit 41 Q is formed in the guide tube 37Q which extends in the axial direction X1 or a direction that is inclined relative to the axial direction X1 so that the guide tube 37Q can elastically be reduced in diameter. Additionally, a second slit 42Q is formed in the washer plate 38Q so as to continue to the first slit 41Q in the guide tube 37Q.

As shown in FIG. 24, the disc springs 22 and the washer plate 38Q are interposed between an end face 361 (a seat portion) of a cylindrical portion 36 of a blocking member 20 and a second surface 182 of a rack guide 18. The washer plate 38Q is interposed between the disc springs 22 and the second surface 182 of the rack guide 18 in such a state that the washer plate 38Q extends along the second surface 182 of the rack guide 18. Namely, the washer plate 38Q includes a first surface 381Q that extends along the second surface 182 of the rack guide 18 and a second surface 382Q that is a seat surface for receiving a load of the disc springs 22. A distance between the end face 361 (the seat portion) of the cylindrical portion 36 and the second surface 382Q of the washer plate 38Q is made greater than a length of the plurality of disc springs 22 that are in close contact with one another.

The washer plate 38Q functions to restrict the occurrence of wear of the second surface 182 of the rack guide 18 by avoiding the contact of the second surface 182 of the rack guide 18 with the disc spring 22, for example, in the case of the rack guide 18 being formed of aluminum. Because of this, the holding member 24Q that includes the washer plate 38Q is formed of steel or resin, for example.

Most of the guide tube 37Q is inserted into the recess portion 35 of the blocking member 20 to be accommodated therein. A compression coil spring 21 extends through an interior of the guide tube 37Q. A gap of a predetermined width is provided between an inner circumference 43Q of the guide tube 37Q and an outer diameter of the compression coil spring 21.

The guide tube 37Q has a second end portion 372Q that is an opposite end portion to a first end portion 371Q where the washer plate 38Q is provided to extend. A gap is provided between the second end portion 372Q of the guide tube 37Q and a bottom 351 of the recess portion 35 of the blocking member 20 in relation to a direction in which the rack guide 18 moves towards or away from a rack shaft 8 (corresponding to a depth direction of a circular hole that is the accommodating portion 16), and the gap is equal to or greater than a distance over which the rack guide 18 moves towards or away from the rack shaft 8.

As shown in FIG. 26, the disc springs 22 and the holding member 24Q are configured as a first sub-assembly SA1Q as a holding member unit that can be treated as an integral unit. In such a state that the first sub-assembly SA1Q is built up, an outer diameter D1Q of the first portion 391Q is made greater than an inner diameter D3 of the inner diameter portions 22a of the disc springs 22 (D1Q>D3). This restricts the disc springs 22 that are disposed between the first portion 391Q and the washer plate 38Q from being dislocated from the guide tube 37Q in the axial direction X1 of the guide tube 37Q. As a result of this, the disc springs 22 and the holding member 24Q can be configured as the first sub-assembly SA1Q (the holding member unit) that can be treated as an integral unit.

An outer diameter D2Q of the second portion 392Q that guides and holds the inner diameter portions 22a of the disc springs 22 is made smaller than the outer diameter D1Q of the first portion 391Q (D2Q<D1Q). Additionally, the outer diameter D2Q of the second portion 392Q is made smaller than the inner diameter D3 of the disc springs 22 (D2Q<D3).

The first portion 391Q may extend along the full circumference of the outer circumference 39Q of the guide tube 37Q or may be made up of a plurality of projecting ribs (not shown) that are provided apart from one another in a circumferential direction of the outer circumference 39Q. In the case of the first portion 391Q being made up of the plurality of projecting ribs, the outer diameter D1Q of the first portion 391 Q corresponds to a diameter of a circumscribed cylinder that is circumscribed around the plurality of projecting ribs.

As shown in FIG. 27, the disc springs 22, the holding member 24Q, the blocking member 20 and a seal member 34 are configured as a second sub-assembly SA2Q as a blocking member unit that can be treated as an integral unit as a result of the first portion 391Q of the outer circumference 39Q of the holding member 24Q being brought into frictional engagement with the inner circumference 352 of the recess portion 35 of the blocking member 20.

The second sub-assembly SA2Q (the blocking member unit) is a unit sub-assembly that is larger than the first sub-assembly SA1Q (the holding member unit). When assembling the second sub-assembly SA2Q, firstly, the first sub-assembly SA1Q is assembled, whereafter the first sub-assembly SA1Q is combined with the blocking member 20 to build up the second sub-assembly SA2Q.

In such a state that the first sub-assembly SA1Q (the holding member unit) is built up as shown in FIG. 26, the outer diameter D1Q of the first portion 391Q of the outer circumference 39Q of the guide tube 37Q is made greater than an inner diameter D4 of the recess portion 35 of the blocking member 20 shown in FIG. 27 (D1Q>D4). Consequently, when the guide tube 37Q of the holding member 24Q of the first sub-assembly SA1Q is fitted in the recess portion 35 of the blocking member 20, the guide tube 37Q is elastically reduced in diameter (that is, reducing the width of the first slit 41Q) so as to be fitted into the recess portion 35. The guide tube 37Q that is elastically reduced in diameter to be fitted into the recess portion 35 is brought into frictional engagement with the inner circumference 352 of the recess portion 35. This allows the first sub-assembly SA1Q (the holding member unit) to be held by the blocking member 20, whereby the second sub-assembly SA2Q (the blocking member unit) is built up.

In the example shown in FIG. 26, in such a state that the first sub-assembly SA1Q is built up, the outer diameter D2Q of the second portion 392Q is made smaller than the inner diameter D3 of the disc springs 22 (D2Q<D3). Although not shown, should the outer diameter D2Q of the second portion 392Q be made equal to the inner diameter D3 of the disc springs 22 (D2Q=D3) in such a state that the first sub-assembly SA1 Q is built up, the outer diameter of the second portion 392Q is preferably smaller than the inner diameter D3 of the disc springs 22 (D2Q<D3) in such a state that the second sub-assembly SA2Q is built up. This is because the second portion 392Q can be restricted from disturbing the elastic deformation of the disc springs 22.

According to this embodiment, the disc springs 22 and the holding member 24Q can easily be integrated into the blocking member 20 so as to be made into the unit (the second sub-assembly SA2Q as the blocking member unit) that can be treated integrally through the simple work of bringing the guide tube 37Q into frictional engagement with the recess portion 35 of the blocking member 20 by adjusting easily the elastic reduction in diameter of the guide tube 37Q of the holding member 24Q by increasing or decreasing the width of the first slit 41Q therein. Consequently, the assembling performance of the rack guide device 15Q as a whole can be improved. Hence, it is possible to provide the steering apparatus 1 that has the superior assembling performance.

In particular, the dimension errors of the constituent components that are assembled together (the holding member 24Q having the guide tube 37Q, the blocking member 20 having the recess portion 35) can be absorbed by increasing or decreasing the width of the first slit 41Q to thereby enable the guide tube 37Q of the holding member 24Q to be brought into frictional engagement with the inner circumference 352 of the recess portion 35 in an ensured fashion.

Additionally, since the load of the disc springs 22 is borne by the holding member 24Q at the washer plate 38Q that is provided at the one end of the guide tube 37Q that guides the inner diameter portions 22a of the disc springs 22, it is possible to restrict the occurrence of wear of the rack guide 18 by the disc springs 22.

Additionally, the disc springs 22 can be restricted from being dislocated from the guide tube 37Q by the first portion 391 Q of the outer circumference 39Q of the guide tube 37Q of the holding member 24Q. Consequently, since the unit including the disc springs 22 and the holding member 24Q and able to be treated as the integral unit (the first sub-assembly SA1Q as the holding member unit) can be made up, the overall assembling performance can be improved.

Additionally, in the case of the plurality of disc springs 22 being used, since the plurality of disc springs 22 that are easy to be loosened to be separated from one another are held together integrally, the plurality of disc springs 22 are preferably restricted from being decentered upon operating.

In addition, when a load is inputted into the rack guide 18 from the rack shaft 8 side to cause the holding member 24Q to be displaced together with the rack guide 18, (the first portion 391Q of the outer circumference 39Q of) the guide tube 37Q of the holding member 24Q frictionally slides on the inner circumference 352 of the recess portion 35 of the blocking member 20 to generate a frictional resisting load. Additionally, in the case of the plurality of disc springs 22 being used, contact surfaces of the plurality of disc springs 22 slide frictionally one on another in association with compression displacement of the disc springs 22 to generate a frictional resisting load. Since the frictional resisting loads generated by the holding member 24Q and the disc springs 22 contribute as an opposing load acting against the load input from the rack shaft 8 side, an overall opposing load including the opposing load by the compression coil spring 21 and the disc springs 22 and the opposing load by the frictional resisting load can be increased.

When a large load is inputted into the rack guide 18 from the rack shaft 8 side, the rack guide 18 moves together with the holding member 24Q towards the blocking member 20. As this occurs, a frictional load generated when (the guide tube 37Q of) the holding member 24Q is brought into frictional engagement with the blocking member 20 can be added to a load generated by the disc springs 22 that are compressed against one another. Consequently, the opposing load can be increased so as to act against the large load. Moreover, when the rack guide 18 returns towards the rack shaft 8, the rack guide 18 can return smoothly.

Additionally, since the compression coil spring 21 that is interposed between the blocking member 20 and the rack guide 18 to bias the rack guide 18 towards the rack shaft 8 is used together with the disc springs 22, the degree of freedom in setting the loads can be improved.

<Thirteenth Embodiment>

Figure 28:
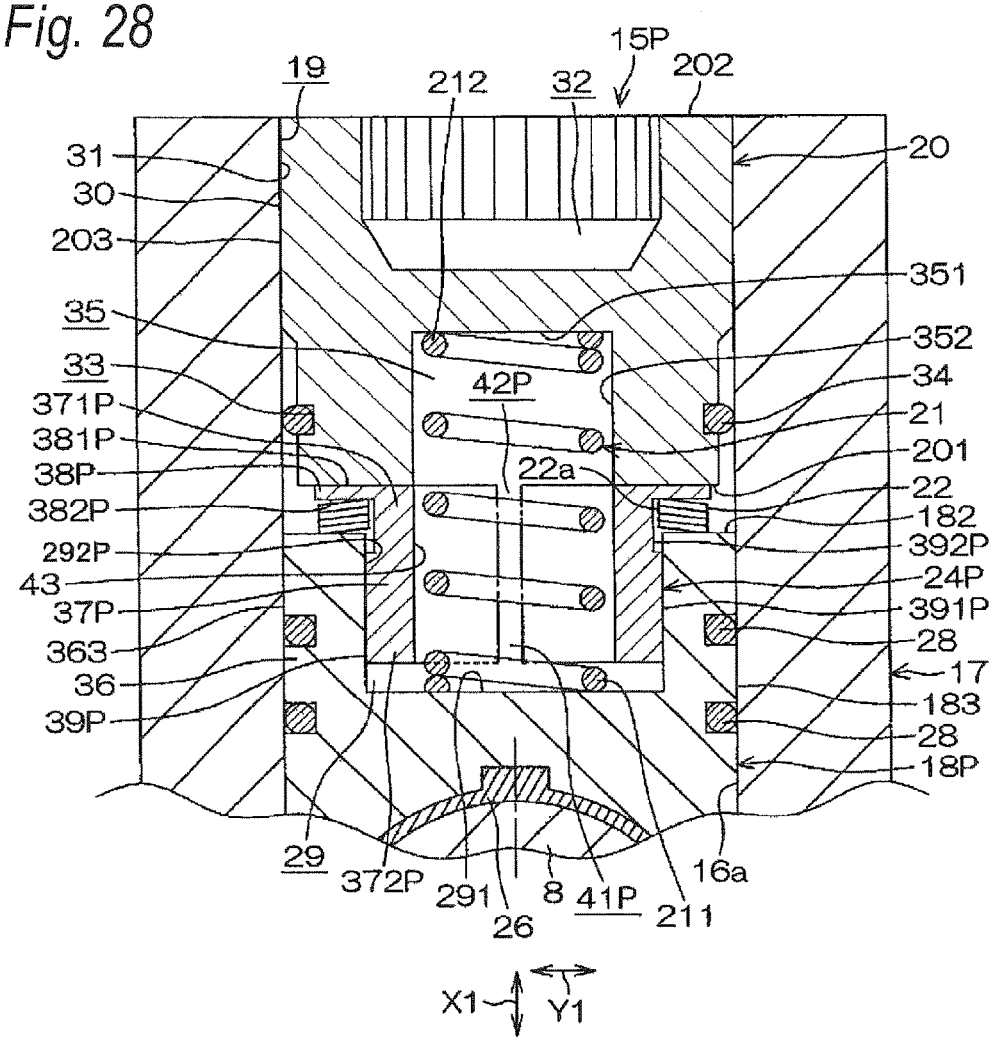
FIG. 28 is an enlarged sectional view of a main part of a rack guide device according to a thirteenth embodiment of the invention, showing a modified example made to the twelfth embodiment shown in FIG. 23.

FIG. 28 is a sectional view of a main part of a rack guide device 15P according to a thirteenth embodiment of the invention. The rack guide device 15P of the thirteenth embodiment shown in FIG. 28 differs from the rack guide device 15Q of the twelfth embodiment shown in FIG. 24 mainly in the following point. Namely, in the rack guide device 15Q of the twelfth embodiment shown in FIG. 24, the guide tube 37Q of the holding member 24Q that holds the disc springs 22 is in frictional engagement with the inner circumference 352 of the recess portion 35 of the blocking member 20.

In contrast with this, in the rack guide device 15P of the thirteenth embodiment shown in FIG. 28, a guide tube 37P of a holding member 24P that holds disc springs 22 are in frictional engagement with an inner circumference 292P of a recess portion 29P of a rack guide 18. The guide tube 37P has a first end portion 371P (corresponding to an end portion facing a blocking member 20) and a second end portion 372P (corresponding to an end portion facing a rack guide 18P) in relation to an axial direction X1. A washer plate 38P extends outwards from the first end portion 371 P in a radial direction Y1.

A compression coil spring 21 is interposed between a bottom 351 of a recess portion 35 of the blocking member 20 and a bottom 291P of the recess portion 29P of the rack guide 18P in a compressed state.

An outer circumference 39P of the guide tube 37P has a first portion 391P that is brought into frictional engagement with an inner circumference 292P of the recess portion 29P and a second portion 392P that guides inner diameter portions 22a of the disc springs 22. A first slit 41P is formed in the guide tube 37P which extends in the axial direction X1 or a direction that is inclined relative to the axial direction X1 so that the guide tube 37P can elastically be reduced in diameter. Additionally, a second slit 42P is formed in the washer plate 38P so as to continue to the first slit 41P in the guide tube 37P.

The washer plate 38P includes a first surface 381P that extends along an end face 201 of the blocking member 20 (corresponding to an end face of a cylindrical portion 36) and a second surface 382P that is a seat surface that receives a load of the disc springs 22.

Like reference numerals to those given to the constituent elements of the twelfth embodiment shown in FIG. 24 are given to like constituent elements of the thirteenth embodiment shown in FIG. 28 to those of the twelfth embodiment shown in FIG. 24.

Figure 30:
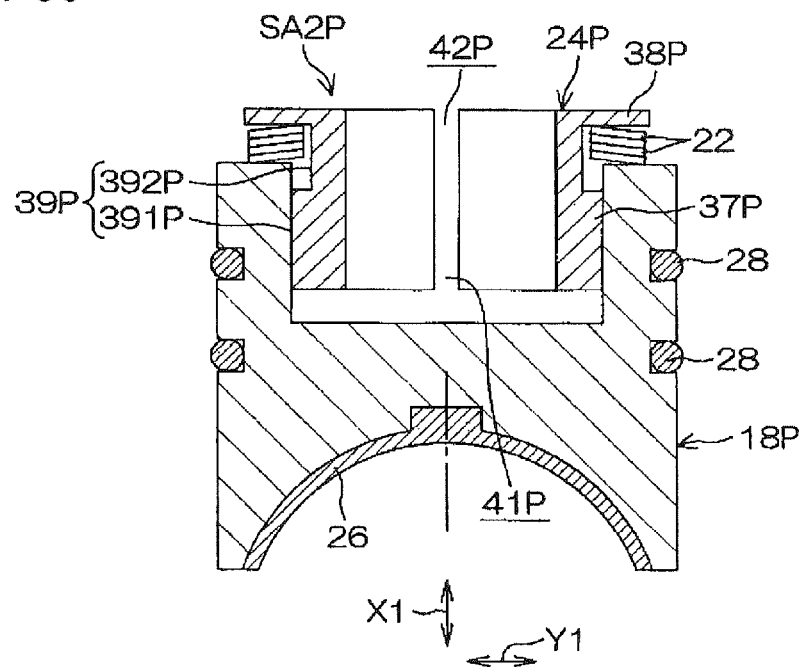
FIG. 30 is a sectional view of a rack guide device (a second sub-assembly SA2)) that includes a disc spring, a holding member and a rack guide in the thirteenth embodiment.

According to thirteenth embodiment, the disc springs 22 and the holding member 24P can easily be integrated into the lack guide 18P so as to be made into a unit (a second sub-assembly SA2P as a rack guide device that includes the disc springs 22, the holding member 24P, the rack guide 18P, elastic members 28 and a sliding contact plate 26 as shown in FIG. 30) that can be treated as an integral unit through the simple work of bringing the guide tube 37P into frictional engagement with the recess portion 29P of the rack guide 18P by adjusting easily the elastic reduction in diameter of the guide tube 37P of the holding member 24P by increasing or decreasing the width of the first slit 41P therein. Consequently, an overall assembling performance of the rack guide device 15P can be improved. Hence, it is possible to provide the steering apparatus 1 that has the superior assembling performance.

In particular, the dimension errors of the constituent components that are assembled together (the holding member 24P having the guide tube 37P, the rack guide 18 having the recess portion 29P, and the like) can be absorbed by increasing or decreasing the width of the first slit 41P to thereby enable the guide tube 37P of the holding member 24P to be brought into frictional engagement with the inner circumference 292P of the recess portion 29P in an ensured fashion.

Additionally, since the load of the disc springs 22 is borne by the holding member 24P at the washer plate 38P that is provided at the one end of the guide tube 37P that guides inner diameter portions 22a of the disc springs 22, it is possible to restrict the occurrence of wear of the blocking member 20 by the disc springs 22.

Figure 29:
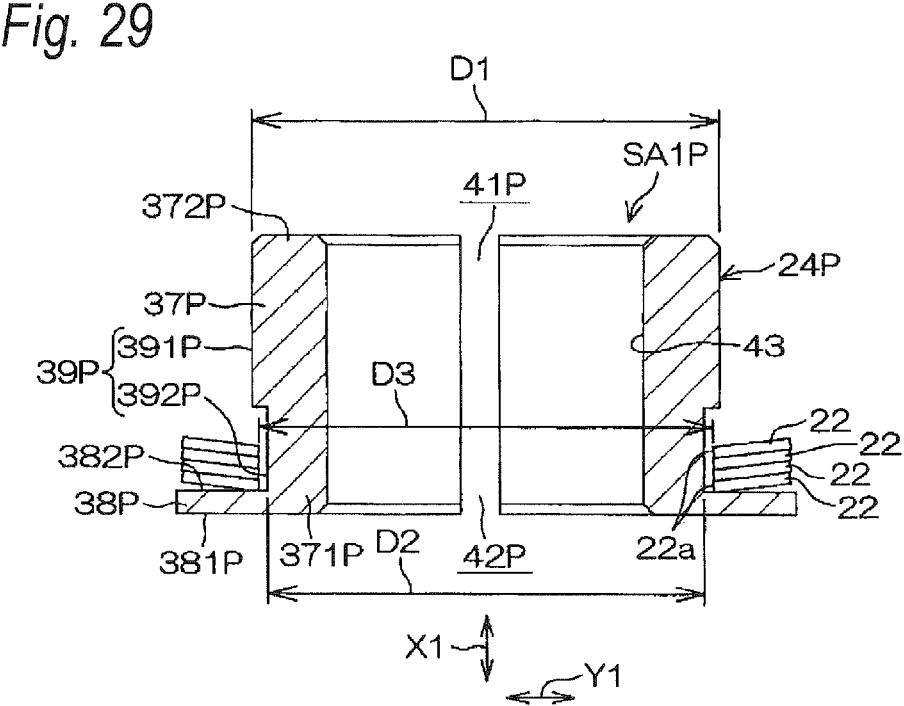
FIG. 29 is a sectional view of a holding member unit (a first sub-assembly) that includes a disc spring and a holding member in the thirteenth embodiment.

Additionally, the disc springs 22 can be restricted from being dislocated from the guide tube 37P by the first portion 391 P of the outer circumference 39P of the guide tube 37P of the holding member 24P. Consequently, since a unit including the disc springs 22 and the holding member 24P and able to be treated as the integral unit (a first sub-assembly SA1P as a holding member unit shown in FIG. 29) can be made up, the overall assembling performance can be improved.

Additionally, in the case of the plurality of disc springs 22 being used, since the plurality of disc springs 22 that are easy to be loosened to be separated from one another are held together integrally, the plurality of disc springs 22 are preferably restricted from being decentered.

In addition, when a load is inputted into the rack guide 18P from the rack shaft 8 side to cause the rack guide 18P to be displaced relative to the holding member 24P, (the first portion 391P of the outer circumference 39P of) the guide tube 37P of the holding member 24P frictionally slides on the inner circumference292P of the recess portion 29P of the rack guide 18P to generate a frictional resisting load. Additionally, in the case of the plurality of disc springs 22 being used, contact surfaces of the plurality of disc springs 22 slide frictionally one on another in association with compression displacement of the disc springs 22 to generate a frictional resisting load. Since the frictional resisting loads generated by the holding member 24P and the disc springs 22 contribute as an opposing load acting against the load input from the rack shaft 8 side, an overall opposing load including the opposing load by a compression coil spring 21 and the disc springs 22 and the opposing load by the frictional resisting load can be increased.

When a large load is inputted into the rack guide 18P from the rack shaft 8 side, the rack guide 18P moves relative to the holding member 24P. As this occurs, a frictional load generated when (the guide tube 37P of) the holding member 24P is brought into frictional engagement with the rack guide 18P can be added to a load generated by the disc springs 22 that are compressed against one another. Consequently, the opposing load can be increased so as to act against the large load. Moreover, when the rack guide 18P returns towards the rack shaft 8, the rack guide 18P can return smoothly.

Additionally, since the compression coil spring 21 that is interposed between the blocking member 20 and the rack guide 18P to bias the rack guide 18P towards the rack shaft 8 is used together with the disc springs 22, the degree of freedom in setting the loads can be improved.

In the thirteenth embodiment shown in FIG. 28, the generation of wear of the rack guide 18P by the disc springs 22 may be restricted by interposing an interposed plate of, for example, iron or resin between an end face of the rack guide 18P and the disc springs.

The invention is not limited to the embodiments that have been described heretofore. For example, not only an O ring having a circular cross section but also a ring having an angular cross section (not shown) can be used as the elastic member that provides the frictional engaging member.

Additionally, in the embodiments that have been described heretofore, although the guide tube of the holding member functions as the inner diameter guide that guides the inner diameter portions 22a that are the radial end portions of the disc springs 22, the guide tube of the holding member may be made to function as an outer diameter guide that guides outer diameter portions that are radial end portions of the disc springs 22. In addition to those described above, various alterations or modifications can be made to the invention without departing from the spirit and scope of the invention.

REFERENCE SIGNS LIST

1: steering apparatus
7: pinion shaft
7a: pinion
8: rack shaft
8a: rack
15, 15A, 15B, 15C, 15D, 15F, 15G: rack guide device
16: accommodating portion
16a: inner circumference
17: housing
18: rack guide
181: first surface
182: second surface
19: external opening end
20, 20A, 20B, 20C, 20G: blocking member
21, 21b, 21G: compression coil spring
211, 211G: first end portion
212, 212G: second end portion
22: disc spring
22a: inner diameter portion (radial end portion)
23, 23A, 23B: elastic member (frictional engaging member)
23H: elastic rod (elastic member, frictional engaging member)
24, 24A, 24B, 24C, 24F, 24G, 24H, 24J, 24K: holding member
29: accommodating recess portion
291: bottom
35: accommodating recess portion
36, 36A: cylindrical portion
361: bottom
362 end face
363: outer circumference
364, 364A: inner circumference (opposing portion)
37, 37A, 37B, 37C, 37D, 37F, 37G, 37H, 37J, 37K: guide tube
371: first end portion
372: second end portion
373, 373A, 3730, 373H, 373J, 373K: outer circumference
374B, 374C, 374F, 374J
374K: inner circumference
38: washer plate
381: first surface
382: second surface
39, 39A, 39B, 39C, 39H: accommodating groove
40: projecting portion
401, 401C: outer circumference (opposing portion)
41, 41E, 41F: rolled bush (elastic member, frictional engaging member)
411, 411E, 411F: inner circumference
412, 412E, 412F: outer circumference
42: connecting member
43 gap restrict plate
431: first surface (gap restrict surface)
432: second surface
44: insertion hole
45: threaded hole
46: screw shaft
47: head portion
D1, D1E: outer diameter (of frictional engaging member)
D1H: diameter (of circle as frictional engaging member that is circumscribed around elastic rods)
D2: inner diameter (of disc springs)
P1: first characteristic portion
P2: second characteristic portion
SA1, SA1E, SA1H: first sub-assembly
SA2, SA2B, SA2D, SA2E, SA2H, SA2J, SA2K: second sub-assembly
15Q, 15P: rack guide device
24Q, 24P: holding member
29Q, 29P: recess portion
291Q, 291P: bottom
292Q, 292P: inner circumference
35: recess portion
351: bottom
352: inner circumference
37Q, 37P: guide tube
371Q, 371P: first end portion (one end)
372Q, 372P: second end portion
38Q, 38P: washer plate
39Q, 39P: outer circumference
391Q, 391P: first portion
392Q, 392P: second portion
41Q, 41P: first slit
42Q, 42P: second slit
D1Q: outer diameter (of first portion)
D2Q: outer diameter (of second portion)
D3: inner diameter (of disc springs)
SA1Q, SA1P: first sub-assembly (holding member unit)
SA2Q: second sub-assembly (blocking member unit)
SA2P: second sub-assembly (rack guide device)
X1: axial direction (of guide tube)
Y1: radial direction (of guide tube)

The invention claimed is:

1. A rack guide device comprising:
a rack guide that is accommodated in an accommodating portion formed in a housing through which a rack shaft configured to mesh with a pinion shaft is inserted so as to move towards and away from the rack shaft and that supports the rack shaft so that the rack shaft slides in an axial direction of the rack shaft;
a blocking member that is fixed to an external opening end that is provided on an opposite side of the accommodating portion to a side thereof that faces the rack shaft;
a compression coil spring that is interposed between the blocking member and the rack guide and biases the rack guide towards the rack shaft;
at least one disc spring that is interposed between the blocking member and the rack guide to bias the rack guide towards the rack shaft; and
a holding member that holds the disc spring and that is directly or indirectly held to the rack guide or the blocking member through frictional engagement so that the disc spring and the holding member are united with either the rack guide or the blocking member to form a subassembly,
wherein
the disc spring engages a surface of the holding member and a surface of either the rack guide or the blocking member such that the surface of the holding member and the surface of either the rack guide or the blocking member are positioned on opposing ends of the disc spring, and
the disc spring is positioned on a radially outer side of a surface of the holding member that is directly or indirectly frictionally engaged with a surface of either the rack guide or the blocking member.

2. The rack guide device according to claim 1, further comprising:
a frictional engaging member that is held on at least one of the blocking member and the holding member and is in frictional engagement with the other.

3. The rack guide device according to claim 2, wherein the frictional engaging member includes an elastic member.

4. The rack guide device according to claim 2, wherein the holding member includes a guide tube that guides a radial end portion of the disc spring and an annular washer plate that extends radially from an axial end of the guide tube to receive a load of the disc spring.

5. The rack guide device according to claim 1, wherein:
the compression coil spring is disposed in series with the disc spring, and
a set load of the compression coil spring is smaller than a set load of the disc spring.

6. The rack guide device according to claim 5, further comprising
a connecting member that connects the holding member to the blocking member so as to restrict a maximum gap amount between the blocking member and the holding member in a direction in which the rack guide moves towards or away from the rack shaft.

7. A steering apparatus including the rack guide device according to claim 1.

8. A rack guide device comprising:
a rack guide that is accommodated in an accommodating portion formed in a housing through which a rack shaft configured to mesh with a pinion shaft is inserted so as to move towards and away from the rack shaft and that supports the rack shaft so that the rack shaft slides in an axial direction of the rack shaft;
a blocking member that is fixed to an external opening end that is provided on an opposite side of the accommodating portion to a side thereof that faces the rack shaft;
at least one disc spring that is interposed between the blocking member and the rack guide to bias the rack guide towards the rack shaft;
a holding member that holds the disc spring and that is directly or indirectly held to the rack guide or the blocking member through frictional engagement, the holding member including a guide tube that guides a radial end portion of the disc spring, and an annular washer plate that extends radially from an axial end of the guide tube to receive a load of the disc spring; and
a frictional engaging member that is held on at least one of the blocking member and the holding member and is in frictional engagement with the other, wherein
the blocking member includes an opposing portion that faces an outer circumference of the guide tube; and
the frictional engaging member is interposed between the circumferential surface of the guide tube and the opposing portion of the blocking member.

9. The rack guide device according to claim 8, wherein
the frictional engaging member is held on the circumferential surface of the guide tube to thereby make up a sub-assembly including the holding member, the frictional engaging member and the disc spring;
the frictional engaging member and the disc spring are disposed on the same side of the guide tube with respect to a radial direction of the guide tube;
the disc spring is disposed between the frictional engaging member and the washer plate with respect to an axial direction of the guide tube; and
in a state that the sub-assembly is configured, when looking at the sub-assembly from the axial direction of the guide tube, a part of the frictional engaging member overlaps a part of the disc spring.

10. A rack guide device comprising:
a rack guide that is accommodated in an accommodating portion formed in a housing through which a rack shaft configured to mesh with a pinion shaft is inserted so as to move towards and away from the rack shaft and that supports the rack shaft so that the rack shaft slides in an axial direction of the rack shaft;
a blocking member that is fixed to an external opening end that is provided on an opposite side of the accommodating portion to a side thereof that faces the rack shaft;
at least one disc spring that is interposed between the blocking member and the rack guide to bias the rack guide towards the rack shaft; and
a holding member that holds the disc spring and that is directly or indirectly held to the rack guide or the blocking member through frictional engagement, wherein
the holding member includes a guide tube that includes an outer circumference having a first portion that is brought into frictional engagement with an inner circumference of a recess portion, and a second portion that guides an inner diameter portion of the disc spring,
the recess portion is provided on one of the rack guide and the blocking member, and
a slit is formed in the guide tube in an axial direction or a direction that is inclined relative to the axial direction so as to enable an elastic reduction in diameter of the guide tube.

11. The rack guide device according to claim 10, wherein
the holding member includes an annular washer plate that extends radially from an axial end of the guide tube to receive a load of the disc spring, and a second slit is formed in the washer plate so as to continue to a first slit that is the slit formed in the guide tube.

12. The rack guide device according to claim 10, comprising a holding member unit that includes the disc spring and the holding member so that the disc spring and the holding member are treated as an integral unit, wherein in the holding member unit, an outer diameter of the first portion is greater than an outer diameter of the second portion and greater than an inner diameter of the disc spring.

* * * * *